United States Patent
Lapstun

(10) Patent No.: US 7,111,791 B2
(45) Date of Patent: Sep. 26, 2006

(54) SYMMETRIC TAGS

(75) Inventor: Paul Lapstun, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 13 days.

(21) Appl. No.: 10/410,484

(22) Filed: Apr. 9, 2003

(65) Prior Publication Data

US 2004/0173687 A1 Sep. 9, 2004

(30) Foreign Application Priority Data

Mar. 4, 2003 (AU) .............................. 2003900983

(51) Int. Cl.
G06K 19/06 (2006.01)
(52) U.S. Cl. ...................... 235/494; 235/375
(58) Field of Classification Search ................ 235/494, 235/462.09, 462.1, 462.07, 375, 289; 382/287, 382/289

See application file for complete search history.

(56) References Cited

U.S. PATENT DOCUMENTS

| | | | |
|---|---|---|---|
| 4,864,618 A | 9/1989 | Wright et al. | |
| 5,051,736 A | 9/1991 | Bennett et al. | |
| 5,477,012 A | 12/1995 | Sekendur | |
| 5,652,412 A | 7/1997 | Lazzouni | |
| 5,661,506 A | 8/1997 | Lazzouni et al. | |
| 5,692,073 A | 11/1997 | Cass | |
| 5,852,434 A | 12/1998 | Sekendur | |
| 6,076,734 A | 6/2000 | Dougherty | |
| 6,182,901 B1* | 2/2001 | Hecht et al. ................. | 235/494 |
| 6,364,209 B1* | 4/2002 | Tatsuta et al. ............... | 235/494 |
| 6,601,772 B1* | 8/2003 | Rubin et al. ................. | 235/494 |
| 6,622,923 B1* | 9/2003 | Walmsley et al. ........... | 235/494 |
| 6,663,008 B1* | 12/2003 | Pettersson et al. .......... | 235/494 |
| 6,681,045 B1* | 1/2004 | Lapstun et al. ............. | 382/187 |
| 6,817,539 B1* | 11/2004 | Walmsley et al. .......... | 235/494 |

FOREIGN PATENT DOCUMENTS

| | | |
|---|---|---|
| GB | 2306669 | 5/1997 |
| WO | WO 99/18487 | 4/1999 |
| WO | WO 99/50787 | 10/1999 |

OTHER PUBLICATIONS

Dymetman, M., and Copperman, M., Intelligent Paper: in Electronic Publishing, Artistic Imaging, and Digital Typography, Proceedings of EP '98, Mar./Apr. 1998, Springer Verlag LNCS 1375, pp. 392-406.

* cited by examiner

*Primary Examiner*—Ahshik Kim

(57) ABSTRACT

Machine-readable coded data for use in the identity-coding and position-coding of surfaces. The machine-readable coded data being disposed on or in a substrate in accordance with a layout having mirror symmetry and n-fold rotational symmetry, where n is at least two, the layout including n identical first sub-layouts rotated 1/n revolutions apart about a center of rotational symmetry of the layout, the layout further including n identical second sub-layouts rotated 1/n revolutions apart about a center of rotational symmetry of the layout, each second sub-layout being a reflection of a corresponding one of the first sub-layouts, the coded data disposed in accordance with each sub-layout including rotation-indicating data that distinguishes the rotation of that sub-layout from the rotation of at least one other sub-layout within the layout, the coded data disposed in accordance with each sub-layout further including reflection-indicating data that distinguishes the reflection of that sub-layout from the reflection of its corresponding reflected sub-layout.

18 Claims, 18 Drawing Sheets

SYMMETRIC TAGS

CROSS-REFERENCES

Various methods, systems and apparatus relating to the present invention are disclosed in the following co-pending applications filed by the applicant or assignee of the present invention. The disclosures of all of these co-pending applications are incorporated herein by cross-reference.

New U.S. Ser. No. 10/409,864 application entitled "Orientation-Indicating Cyclic Position Codes"

New U.S. Ser. No. 10/409,876 application entitled "Methods and Systems for Object Identification and Interaction"

Australian Provisional Application No 2003901617 entitled "Methods and Systems for Object Identification and Interaction"

New U.S. Ser. No. 10/409,848 application entitled "Methods and Systems for Object Identification and Interaction"

New U.S. Ser. No. 10/409,845 application entitled "Methods and Systems for Object Identification and Interaction"

Filed 4 Mar. 2003:
Australian Provisional Application No 2003900983 entitled "Methods, Systems and Apparatus".

Filed 26 Feb. 2003:
Australian Provisional Application No 2003900865 entitled "Methods, Systems and Apparatus".

Filed 26 Feb. 2003:
Australian Provisional Application No 2003900861 entitled "Methods, Systems and Apparatus".

Filed 17 Feb. 2003:
Australian Provisional Application No entitled "Methods, Systems and Apparatus".

Filed 4 Dec. 2002:
U.S. Ser. No. 10/309,358 entitled "Rotationally Symmetric Tags".

Filed 22 Nov. 2002:
PCT/AU02/01572 and PCT/AU/02/01573.

Filed 25 Oct. 2002:
Australian Provisional Application 2002952259 entitled "Methods and Apparatus".

Filed 15 Oct. 2002:
PCT/AU02/01391, PCT/AU02/01392, PCT/AU02/01393, PCT/AU02/01394 and PCT/AU02/01395.

Filed 26 Nov. 2001:
PCT/AU01/01527, PCT/AU01/01528, PCT/AU01/01529, PCT/AU01/01530 and PCT/AU01/01531.

Filed 11 Oct. 2001:
PCT/AU01/01274.

Filed 14 Aug. 2001:
PCT/AU01/00996.

Filed 27 Nov. 2000:
PCT/AU00/01442, PCT/AU00/01444, PCT/AU00/01446, PCT/AU00/01445, PCT/AU00/01450, PCT/AU00/01453, PCT/AU00/01448, PCT/AU00/01447, PCT/AU00/01459, PCT/AU00/01451, PCT/AU00/01454, PCT/AU00/01452, PCT/AU00/01443, PCT/AU00/01455, PCT/AU00/01456, PCT/AU00/01457, PCT/AU00/01458 and PCT/AU00/01449.

Filed 20 Oct. 2000:
PCT/AU00/01273, PCT/AU00/01279, PCT/AU00/01288, PCT/AU00/01282, PCT/AU00/01276, PCT/AU00/01280, PCT/AU00/01274, PCT/AU00/01289, PCT/AU00/01275, PCT/AU00/01277, PCT/AU00/01286, PCT/AU00/01281, PCT/AU00/01278, PCT/AU00/01287, PCT/AU00/01285, PCT/AU00/01284 and PCT/AU00/01283.

Filed 15 Sep. 2000:
PCT/AU00/01108, PCT/AU00/01110 and PCT/AU00/01111.

Filed 30 Jun. 2000:
PCT/AU00/00762, PCT/AU00/00763, PCT/AU00/00761, PCT/AU00/00760, PCT/AU00/00759, PCT/AU00/00758, PCT/AU00/00764, PCT/AU00/00765, PCT/AU00/00766, PCT/AU00/00767, PCT/AU00/00768, PCT/AU00/00773, PCT/AU00/00774, PCT/AU00/00775, PCT/AU00/00776, PCT/AU00/00777, PCT/AU00/00770, PCT/AU00/00769, PCT/AU00/00771, PCT/AU00/00772, PCT/AU00/00754, PCT/AU00/00755, PCT/AU00/00756 and PCT/AU00/00757.

Filed 24 May 2000:
PCT/AU00/00518, PCT/AU00/00519, PCT/AU00/00520, PCT/AU00/00521, PCT/AU00/00522, PCT/AU00/00523, PCT/AU00/00524, PCT/AU00/00525, PCT/AU00/00526, PCT/AU00/00527, PCT/AU00/00528, PCT/AU00/00529, PCT/AU00/00530, PCT/AU00/00531, PCT/AU00/00532, PCT/AU00/00533, PCT/AU00/00534, PCT/AU00/00535, PCT/AU00/00536, PCT/AU00/00537, PCT/AU00/00538, PCT/AU00/00539, PCT/AU00/00540, PCT/AU00/00541, PCT/AU00/00542, PCT/AU00/00543, PCT/AU00/00544, PCT/AU00/00545, PCT/AU00/00547, PCT/AU00/00546, PCT/AU00/00554, PCT/AU00/00556, PCT/AU00/00557, PCT/AU00/00558, PCT/AU00/00559, PCT/AU00/00560, PCT/AU00/00561, PCT/AU00/00562, PCT/AU00/00563, PCT/AU00/00564, PCT/AU00/00565, PCT/AU00/00566, PCT/AU00/00567, PCT/AU00/00568, PCT/AU00/00569, PCT/AU00/00570, PCT/AU00/00571, PCT/AU00/00572, PCT/AU00/00573, PCT/AU00/00574, PCT/AU00/00575, PCT/AU00/00576, PCT/AU00/00577, PCT/AU00/00578, PCT/AU00/00579, PCT/AU00/00581, PCT/AU00/00580, PCT/AU00/00582, PCT/AU00/00587, PCT/AU00/00588, PCT/AU00/00589, PCT/AU00/00583, PCT/AU00/00593, PCT/AU00/00590, PCT/AU00/00591, PCT/AU00/00592, PCT/AU00/00594, PCT/AU00/00595, PCT/AU00/00596, PCT/AU00/00597, PCT/AU00/00598, PCT/AU00/00516, PCT/AU00/00517 and PCT/AU00/00511.

FIELD OF INVENTION

This invention relates to symmetric tags and their use in the identity-coding and position-coding of surfaces.

BACKGROUND

It is known to provide one or more coded data structures on a surface that can be read and decoded by a suitable sensing device. Various embodiments of such a device incorporating an optical sensor are described in many of the documents incorporated into the present application by cross-reference.

The coded data structures disclosed in these documents include target features that enable the sensing device to identify the position of each structure. The relative positions of the features within each structure can also be interpreted to determine perspective distortion of the structure as sensed, enabling perspective correction to be performed on the sensed data. However, to enable the sensing device to decode the data in the structure, it is necessary that the position and orientation of the data relative to the structure and the position and orientation of the structure relative to the viewpoint be determined. Typically, this is achieved by providing at least one feature in the structure that is asymmetric in some way. For example, in one embodiment, a keyhole-shaped feature is provided that can be located with respect to the other features, and then recognised to ascertain the rotational orientation of the structure in relation to the sensing device. The actual data that is encoded in the data structure can then be decoded, since its position and orientation relative to the structure can be inferred.

Disadvantages with this arrangement include the need to dedicate space to one or more orientation features, and the difficulty of including redundancy in such features for the purposes of allowing orientation determination in the presence of damage to the features. It is desirable, therefore, to encode orientation information both more space-efficiently and in an error-detectable and/or error-correctable fashion.

SUMMARY OF THE INVENTION

In accordance with a first aspect of the invention, there is provided machine-readable coded data disposed on or in a substrate in accordance with a layout having n-fold rotational symmetry, where n is at least two, the layout including n identical first sub-layouts rotated 1/n revolutions apart about a center of rotational symmetry of the layout, the coded data disposed in accordance with each first sub-layout including rotation-indicating data that distinguishes the rotation of that first sub-layout from the rotation of at least one other first sub-layout within the layout.

Preferably, the rotation-indicating data distinguishes the rotation of the first sub-layout from the rotation of each of the other first sub-layouts within the layout.

Preferably, the layout includes at least one second sub-layout, the coded data disposed in accordance with the second sub-layout including type-indicating data that distinguishes the type of that layout from the type of at least one other adjacent layout.

In a preferred form, the coded data is redundantly encoded and the coded data of each sub-layout includes at least one coded data codeword. More preferably, the coded data is redundantly encoded using a Reed-Solomon encoding.

Preferably, each sub-layout defines a plurality of positions of data elements, the sub-layouts being interleaved with each other without any two data elements overlapping each other.

In a preferred form, the layout is repeated on the substrate to form a super-layout. More preferably, the layouts are packed together on the substrate to form the super-layout.

The layout can take the form of any of the following shapes:

linear;

square;

rectangular;

triangular; or hexagonal.

In a preferred form, the coded data includes one or more target features for enabling preliminary location and rotation of the layout to be determined by a machine used to read the coded data. More preferably, the target features are configured to enable perspective correction of the coded data of the, or each, layout upon reading by the machine. It is particularly preferred that the coded data include at least four of the target features, and that a plurality of the layouts share some of the same target features.

Preferably, at least one of the coded data codewords of at least one of the first sub-layouts of a layout is different from the corresponding coded data codeword of an adjacent layout in the super-layout.

Preferably also, at least one of the coded data codewords of at least one of the first sub-layouts of a layout is the same as the corresponding coded data codeword of a non-adjacent layout in the super-layout.

In accordance with a second aspect of the invention, there is provided a surface bearing machine-readable coded data in accordance with the first aspect.

Preferably, the surface includes additional visible markings.

It is particularly preferred that the surface be configured for use as an interface surface for enabling user interaction with a computer.

In accordance with a third aspect of the invention, there is provided a method of generating an interface surface, including the steps of:

receiving, in a printer, user data;

generating machine-readable coded data incorporating the user data, in accordance the first aspect; and printing the coded data onto a substrate.

Preferably, the method further includes the step of printing visible markings on the substrate, preferably simultaneously with the coded data.

In accordance with a fourth aspect of the invention, there is provided a method of using a sensing device to read machine-readable coded data in accordance with the first aspect, the method including the steps of:

(a) reading, using the sensing device, the coded data of the layout;

(b) decoding the coded data of at least one of the sub-layouts of the layout, thereby determining at least the rotation-indicating data of that sub-layout; and (c) using the rotation-indicating data to interpret the meaning of at least some of the coded data.

Preferably, step (a) includes the substeps of:

imaging the substrate to generate an image thereof;

processing the image to locate one or more target features of the coded data; and on the basis of the located target features, determining a position of at least one of the sub-layouts.

Preferably, the method includes the step of using the rotation-indicating data to determine the rotation of at least one other sub-layout of the layout.

Preferably, the method includes the step of decoding the coded data of at least one of the sub-layouts of the layout, thereby determining at least the type-indicating data of that sub-layout. More preferably, the method includes the step of using the type-indicating data to interpret the meaning of at least some of the coded data.

In accordance with a fifth aspect of the invention, there is provided machine-readable coded data disposed on or in a substrate in accordance with a layout having mirror symmetry and n-fold rotational symmetry, where n is at least two, the layout including n identical first sub-layouts rotated 1/n revolutions apart about a center of rotational symmetry of the layout, the layout further including n identical second sub-layouts rotated 1/n revolutions apart about a center of rotational symmetry of the layout, each second sub-layout being a reflection of a corresponding one of the first sub-layouts, the coded data disposed in accordance with each sub-layout including rotation-indicating data that distinguishes the rotation of that sub-layout from the rotation of at least one other sub-layout within the layout, the coded data disposed in accordance with each sub-layout further including reflection-indicating data that distinguishes the reflection of that sub-layout from the reflection of its corresponding reflected sub-layout.

Preferably, the rotation-indicating data and the reflection-indicating data together distinguish the rotation and reflection of the sub-layout from the rotation and reflection of each of the other sub-layouts within the layout.

In a preferred form, the coded data is redundantly encoded and the coded data of each sub-layout includes at least one coded data codeword. More preferably, the coded data is redundantly encoded using a Reed-Solomon encoding.

Preferably, each sub-layout defines a plurality of positions of data elements, the sub-layouts being interleaved with each other without any two data elements overlapping each other.

In a preferred form, the layout is repeated on the substrate to form a super-layout. More preferably, the layouts are packed together on the substrate to form the super-layout.

The layout can take the form of any of the following shapes:
  linear;
  square;
  rectangular;
  triangular; or
  hexagonal.

In a preferred form, the coded data includes one or more target features for enabling preliminary location and rotation of the layout to be determined by a machine used to read the coded data. More preferably, the target features are configured to enable perspective correction of the coded data of the, or each, layout upon reading by the machine. It is particularly preferred that the coded data include at least four of the target features, and that a plurality of the layouts share some of the same target features.

In accordance with a sixth aspect of the invention, there is provided a surface bearing machine-readable coded data in accordance with the fifth aspect.

Preferably, the surface includes additional visible markings.

It is particularly preferred that the surface be configured for use as an interface surface for enabling user interaction with a computer.

In accordance with a seventh aspect of the invention, there is provided a method of generating an interface surface, including the steps of:
  receiving, in a printer, user data;
  generating machine-readable coded data incorporating the user data, in accordance the fifth aspect; and
  printing the coded data onto a substrate.

Preferably, the method further includes the step of printing visible markings on the substrate, preferably simultaneously with the coded data.

In accordance with a eighth aspect of the invention, there is provided a method of using a sensing device to read machine-readable coded data in accordance with the fifth aspect, the method including the steps of:
  (a) reading, using the sensing device, the coded data of the layout;
  (b) decoding the coded data of at least one of the sub-layouts of the layout, thereby determining at least the rotation-indicating data and reflection-indicating data of that sub-layout; and
  (c) using the rotation-indicating data and reflection-indicating data to interpret the meaning of at least some of the coded data.

Preferably, step (a) includes the substeps of:
  imaging the substrate to generate an image thereof;
  processing the image to locate one or more target features of the coded data; and
  on the basis of the located target features, determining a position of at least one of the sub-layouts.

BRIEF DESCRIPTION OF THE DRAWINGS

Preferred and other embodiments of the invention will now be described, by way of non-limiting example only, with reference to the accompanying drawings, in which.

DESCRIPTION OF PREFERRED AND OTHER EMBODIMENTS

Figure 1:
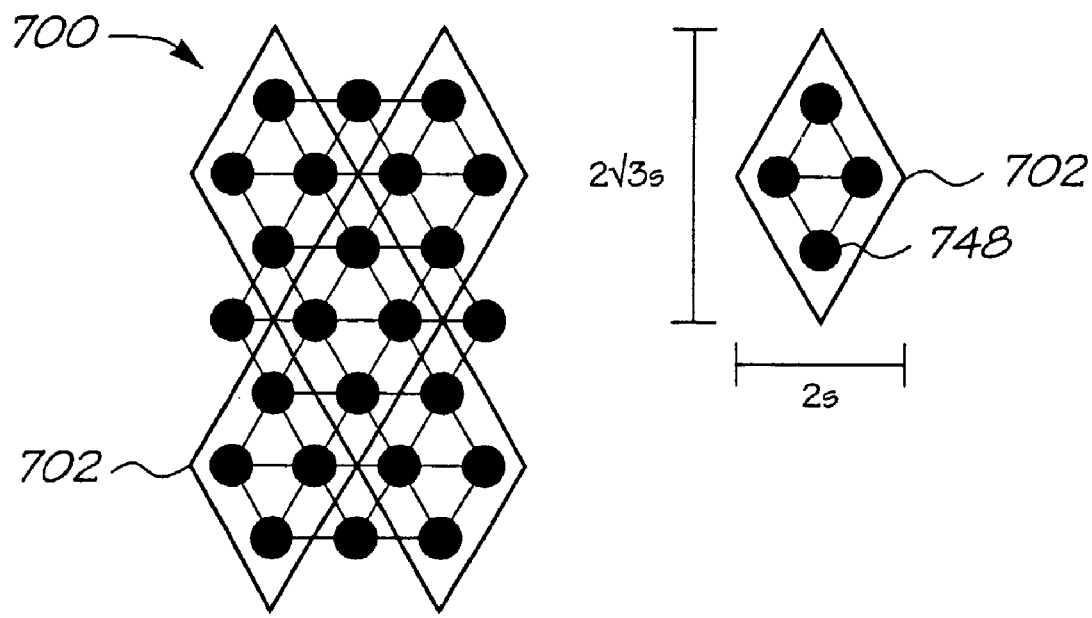
FIG. 1 shows a triangular macrodot packing with a four-bit symbol unit outlined, for use with an embodiment of the invention.

In the preferred embodiment, the invention is configured to work with the netpage networked computer system, an overview of which follows. It will be appreciated that not every implementation will necessarily embody all or even most of the specific details and extensions discussed in relation to the basic netpage system.

In its preferred form, the netpage system relies on the production of, and human interaction with, netpages. These are pages of text, graphics and images printed on ordinary paper, but which work like interactive web pages. Information is encoded on each page using ink which is substantially invisible to the unaided human eye. The ink, however, and thereby the coded data, can be sensed by an optically imaging pen and transmitted to the netpage system.

In the preferred form, active buttons and hyperlinks on each page can be clicked with a sensing pen to request information from the network or to signal preferences to a network server. In one embodiment, text written by hand on a netpage is automatically recognized and converted to computer text in the netpage system, allowing forms to be filled in. In other embodiments, signatures recorded on a netpage are automatically verified, allowing e-commerce transactions to be securely authorized.

A detailed description of several forms of the netpage system, as well as a netpage printer and a netpage sensing device in the form of a stylus and pen is described in the present applicants' co-pending PCT application WO 00/72230 entitled "Sensing Device, filed 24 May 2000; and U.S. application U.S. Ser. No. 09/721,893 entitled "Sensing Device", filed 25 Nov. 2000, now granted U.S. Pat. No. 6,792,165.

1.1 Netpages

Netpages are the foundation on which a netpage network is built. They provide a paper-based user interface to published information and interactive services.

A netpage consists of a printed page (or other surface region) invisibly tagged with references to an online description of the page. The online page description is maintained persistently by a netpage page server. The page description describes the visible layout and content of the page, including text, graphics and images. It also describes the input elements on the page, including buttons, hyperlinks, and input fields. A netpage allows markings made with a netpage pen on its surface to be simultaneously captured and processed by the netpage system.

Multiple netpages can share the same page description. However, to allow input through otherwise identical pages to be distinguished, each netpage is assigned a unique page identifier. This page ID has sufficient precision to distinguish between a very large number of netpages.

Each reference to the page description is encoded in a printed tag. The tag identifies the unique page on which it appears, and thereby indirectly identifies the page description. The tag also identifies its own position on the page. Characteristics of the tags are described in more detail below.

Tags are printed in infrared-absorptive ink on any substrate which is infrared-reflective, such as ordinary paper. Near-infrared wavelengths are invisible to the human eye but are easily sensed by a solid-state image sensor with an appropriate filter.

A tag is sensed by an area image sensor in the netpage pen, and the decoded tag data is transmitted to the netpage system via the nearest netpage relay, such as a suitably-enabled personal computer, PDA, mobile phone or netpage printer. The pen is wireless and communicates with the netpage relay via a short-range radio link. The pen may also incorporate the relay functionality. Tags are sufficiently small and densely arranged that the pen can reliably image at least one tag even on a single click on the page. It is important that the pen recognize the page ID and position on every interaction with the page, since the interaction is stateless. Tags are error-correctably encoded to make them partially tolerant to surface damage.

The netpage page server maintains a unique page instance for each printed netpage, allowing it to maintain a distinct set of user-supplied values for input fields in the page description for each printed netpage.

1.2 Coded Data on Surfaces Using Netpage Tags

Various netpage coding schemes and patterns are described in the present applicants' co-pending PCT application WO 00/72249 entitled "Identity-Coded Surface with Reference Points", filed 24 May 2000; co-pending PCT application WO 02/84473 entitled "Cyclic Position Codes", filed 11 Oct. 2001; U.S. application U.S. Ser. No. 10/309,358 entitled "Rotationally Symmetric Tags", filed 4 Dec. 2002; and Australian Provisional Application 2002952259 entitled "Methods and Apparatus", filed 25 Oct. 2002.

1.2.1 Tag Data Content

In a preferred form, each tag identifies the region in which it appears, and the location of that tag within the region. A tag may also contain flags which relate to the region as a whole or to the tag. One or more flag bits may, for example, signal a tag sensing device to provide feedback indicative of a function associated with the immediate area of the tag, without the sensing device having to refer to a description of the region. A netpage pen may, for example, illuminate an "active area" LED when in the zone of a hyperlink.

The tags preferably tile the entire page, and are sufficiently small and densely arranged that the pen can reliably image at least one tag even on a single click on the page. It is important that the pen recognize the page ID and position on every interaction with the page, since the interaction is stateless.

In a preferred embodiment, the region to which a tag refers coincides with an entire page, and the region ID encoded in the tag is therefore synonymous with the page ID of the page on which the tag appears. In other embodiments, the region to which a tag refers can be an arbitrary subregion of a page or other surface. For example, it can coincide with the zone of an interactive element, in which case the region ID can directly identify the interactive element.

Each tag typically contains 16 bits of tag ID, at least 90 bits of region ID, and a number of flag bits. Assuming a maximum tag density of 64 per square inch, a 16-bit tag ID supports a region size of up to 1024 square inches. Larger regions can be mapped continuously without increasing the tag ID precision simply by using abutting regions and maps. The distinction between a region ID and a tag ID is mostly one of convenience. For most purposes the concatenation of the two can be considered as a globally unique tag ID. Conversely, it may also be convenient to introduce structure into the tag ID, for example to define the x and y coordinates of the tag. A 90-bit region ID allows $2^{90}$ (~$10^{27}$ or a thousand trillion trillion) different regions to be uniquely identified. Tags may also contain type information, and a region may be tagged with a mixture of tag types. For example, a region may be tagged with one set of tags encoding x coordinates and another set, interleaved with the first, encoding y coordinates. It will be appreciated the region ID and tag ID precision may be more or less than just described depending on the environment in which the system will be used.

1.2.2 Tag Data Encoding

Figure 11:
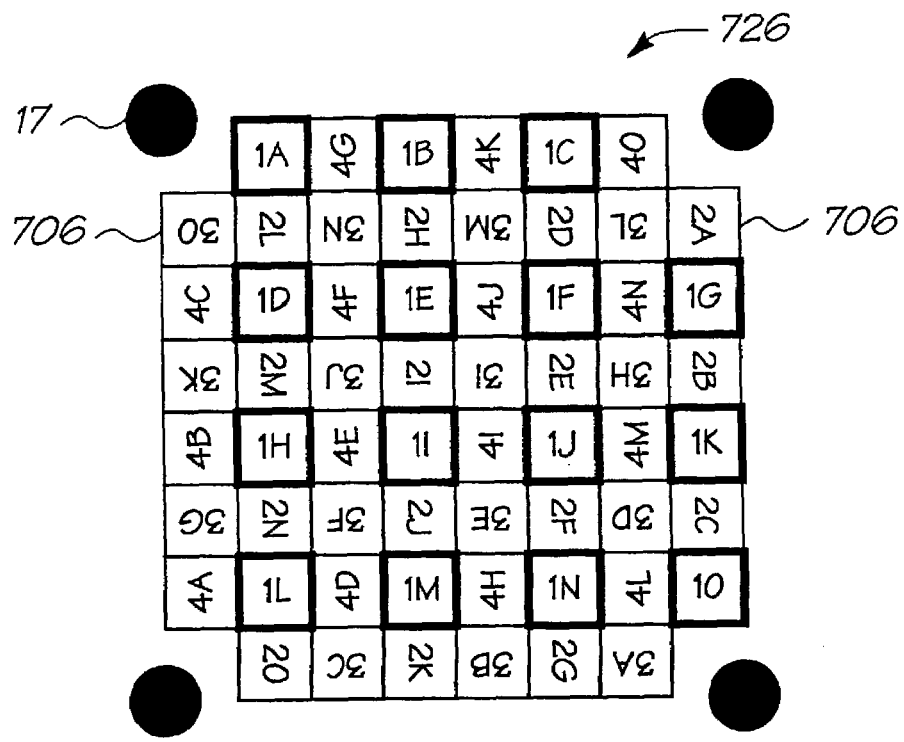
FIG. 11 shows a logical layout of a square tag using the tag segment of FIG. 6, with four interleaved $2^4$-ary $(15, k)$ codewords.
Figure 13:
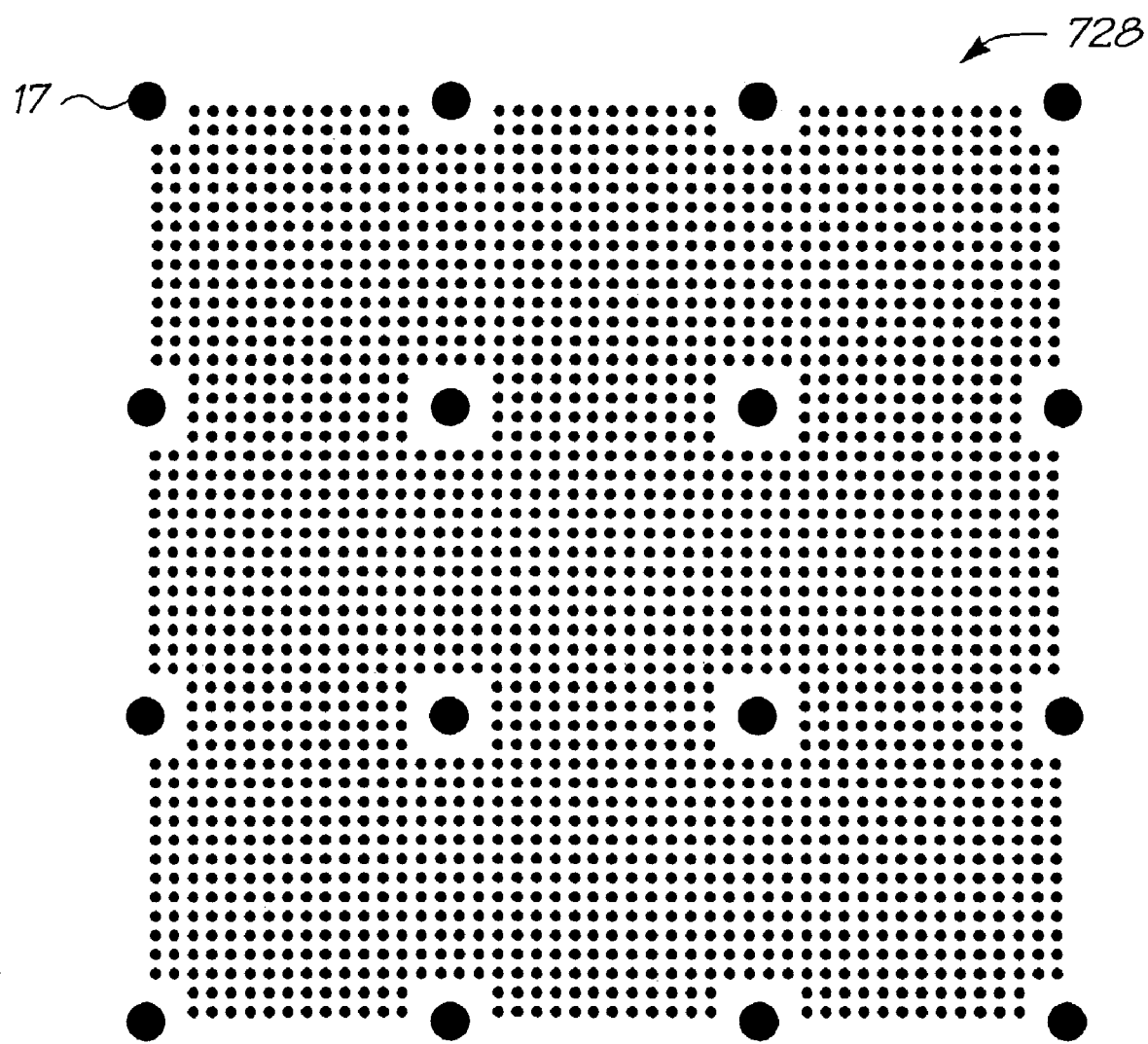
FIG. 13 shows an arrangement of nine abutting tags of the design of FIG. 11 and FIG. 12, with shared targets.
Figure 14:
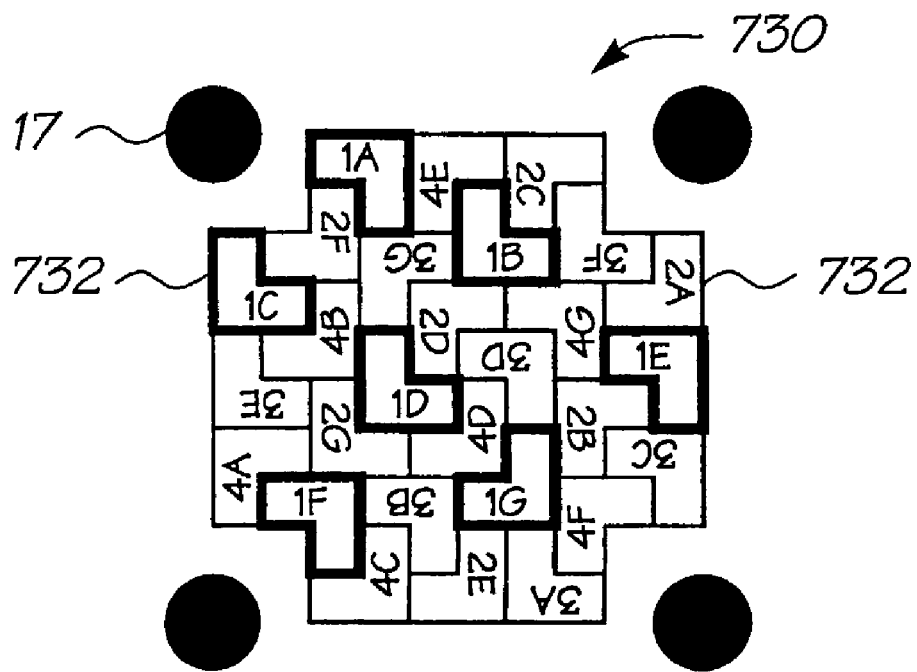
FIG. 14 shows a logical layout of an alternative square tag, with four interleaved $2^3$-ary $(7, k)$ codewords
Figure 15:
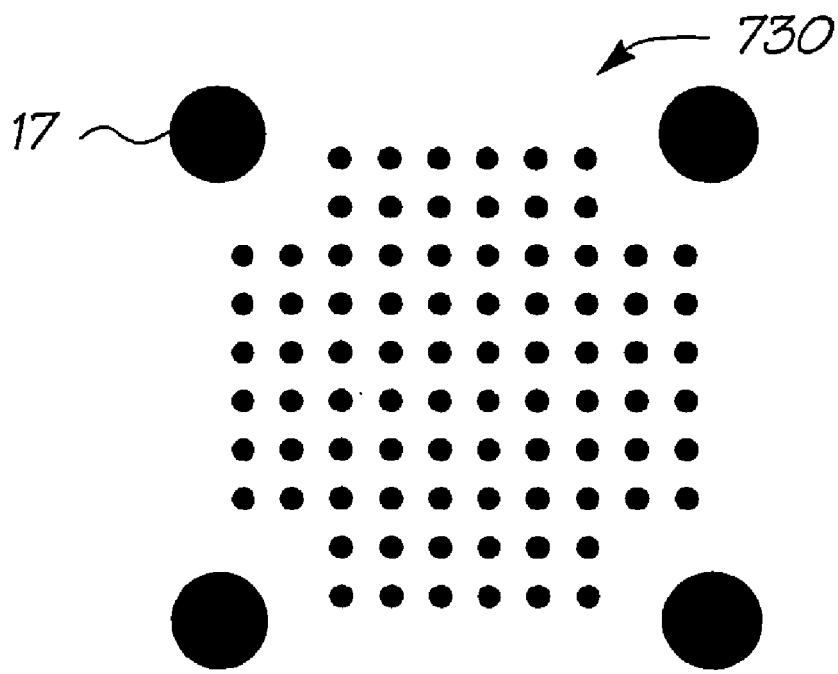
FIG. 15 shows the macrodot layout of the square tag of FIG. 14.

FIG. 11 shows one embodiment of a netpage tag in the form of a square tag 726 with four perspective targets 17. It is similar in appearance to tags described by Bennett et al. in U.S. Pat. No. 5,051,746. The tag 726 represents sixty 4-bit Reed-Solomon symbols 747 (see the description of FIG. 1, FIG. 2 and FIG. 3 below for a discussion of symbols), for a total of 240 bits. The tag represents each "one" bit by the presence of a mark 748, referred to as a macrodot, and each "zero" bit by the absence of the corresponding macrodot. FIG. 13 shows a square tiling 728 of nine tags, containing all "one" bits for illustrative purposes. It will be noted that the perspective targets are designed to be shared between adjacent tags.

Using a (15, 7) Reed-Solomon code, 112 bits of tag data are redundantly encoded to produce 240 encoded bits. The four codewords are interleaved spatially within the tag to maximize resilience to burst errors. The (15, 7) code allows up to 4 symbol errors to be corrected per codeword, i.e. it is tolerant of a symbol error rate of up to 27% per codeword.

Each 4-bit symbol is represented in a spatially coherent way in the tag, and the symbols of the four codewords are interleaved spatially within the tag. This ensures that a burst error (an error affecting multiple spatially adjacent bits) damages a minimum number of symbols overall and a minimum number of symbols in any one codeword, thus maximising the likelihood that the burst error can be fully corrected.

Any suitable error-correcting code code can be used in place of a (15, 7) Reed-Solomon code, for example: a Reed-Solomon code with more or less redundancy, with the same or different symbol and codeword sizes; another block code; or a different kind of code, such as a convolutional code (see, for example, Stephen B. Wicker, Error Control Systems for Digital Communication and Storage, Prentice-Hall 1995, the contents of which a herein incorporated by reference thereto).

In order to support "single-click" interaction with a tagged region via a sensing device, the sensing device must be able to see at least one entire tag in its field of view no matter where in the region or at what orientation it is positioned. The required diameter of the field of view of the sensing device is therefore a function of the size and spacing of the tags.

The data-bearing macrodots 748 of the tag are designed to not overlap their neighbors, so that groups of tags cannot produce structures that resemble targets. This also saves ink. The perspective targets allow detection of the tag, so further targets are not required.

Although the tag may contain an orientation feature to allow disambiguation of the four possible orientations of the tag relative to the sensor, the present invention is concerned with embedding orientation and related transform data in the tag data. For example, the four codewords can be arranged so that each tag orientation (in a rotational sense) contains one codeword placed at that orientation, as shown in FIG. 11, where each symbol is labelled with the number of its codeword (1-4) and the position of the symbol within the codeword (A-O). Tag decoding then consists of decoding one codeword at each rotational orientation. Each codeword can either contain a single bit indicating whether it is the first codeword, or two bits indicating which codeword it is. The latter approach has the advantage that if, say, the data content of only one codeword is required, then at most two codewords need to be decoded to obtain the desired data. This may be the case if the region ID is not expected to change within a stroke and is thus only decoded at the start of a stroke. Within a stroke only the codeword containing the tag ID is then desired. Furthermore, since the rotation of the sensing device changes slowly and predictably within a stroke, only one codeword typically needs to be decoded per frame.

It is possible to dispense with perspective targets altogether and instead rely on the data representation being self-registering. In this case each bit value (or multi-bit value) is typically represented by an explicit glyph, i.e. no bit value is represented by the absence of a glyph. This ensures that the data grid is well-populated, and thus allows the grid to be reliably identified and its perspective distortion detected and subsequently corrected during data sampling. To allow tag boundaries to be detected, each tag data must contain a marker pattern, and these must be redundantly encoded to allow reliable detection. The overhead of such marker patterns is similar to the overhead of explicit perspective targets. Such scheme uses dots positioned a various points relative to grid vertices to represent different glyphs and hence different multi-bit values, as discussed in the present applicants' co-pending PCT application WO 02/084473 entitled "Cyclic Position Codes", filed 11 Oct. 2001

The arrangement 728 of FIG. 13 shows that the square tag 726 can be used to fully tile or tesselate, i.e. without gaps or overlap, a plane of arbitrary size.

Although in preferred embodiments the tagging schemes described herein encode a single data bit using the presence or absence of a single undifferentiated macrodot, they can also use sets of differentiated glyphs to represent single-bit or multi-bit values, such as the sets of glyphs illustrated in the present applicants' co-pending PCT application WO 02/084473 entitled "Cyclic Position Codes", filed 11 Oct. 2001.

Macrodot Packing Schemes

Figure 2:
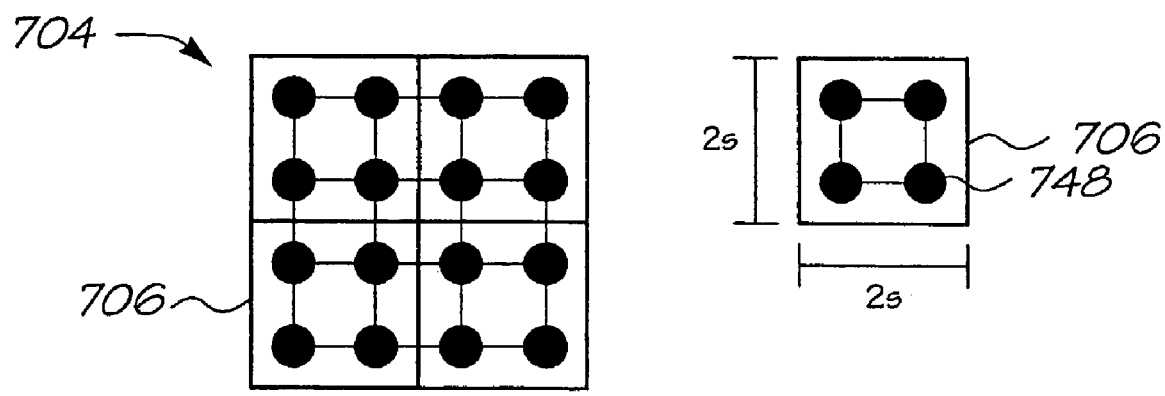
FIG. 2 shows a square macrodot packing with a four-bit symbol unit outlined, for use with an embodiment of the invention.
Figure 3:
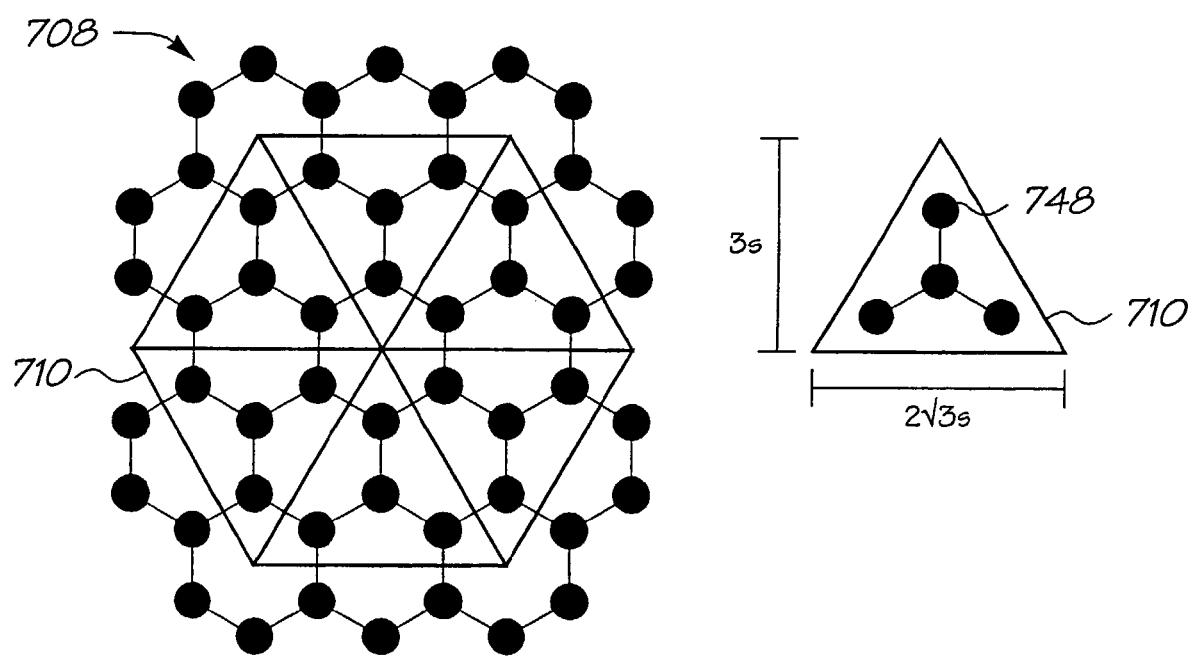
FIG. 3 shows a hexagonal macrodot packing with a four-bit symbol unit outlined, for use with an embodiment of the invention.

FIG. 1 shows a triangular macrodot packing 700 with a four-bit symbol unit 702 outlined. The area of the symbol unit is given by $A_{UNIT}=2\sqrt{3}s^2 \cong 3.5s^2$, where s the spacing of adjacent macrodots. FIG. 2 shows a square macrodot packing 704 with a four-bit symbol unit 706 outlined. The area of the symbol unit is given by $A_{UNIT}=4s^2$. FIG. 3 shows a hexagonal macrodot packing 708 with a four-bit symbol unit 710 outlined. The area of the symbol unit is given by $A_{UNIT}=3\sqrt{3}s^2 \cong 5.2s^2$. Of these packing schemes, the triangular packing scheme gives the greatest macrodot density for a particular macrodot spacing s.

In preferred embodiments, s has a value between 100 μm and 200 μm.

Tag Designs

Figure 4:
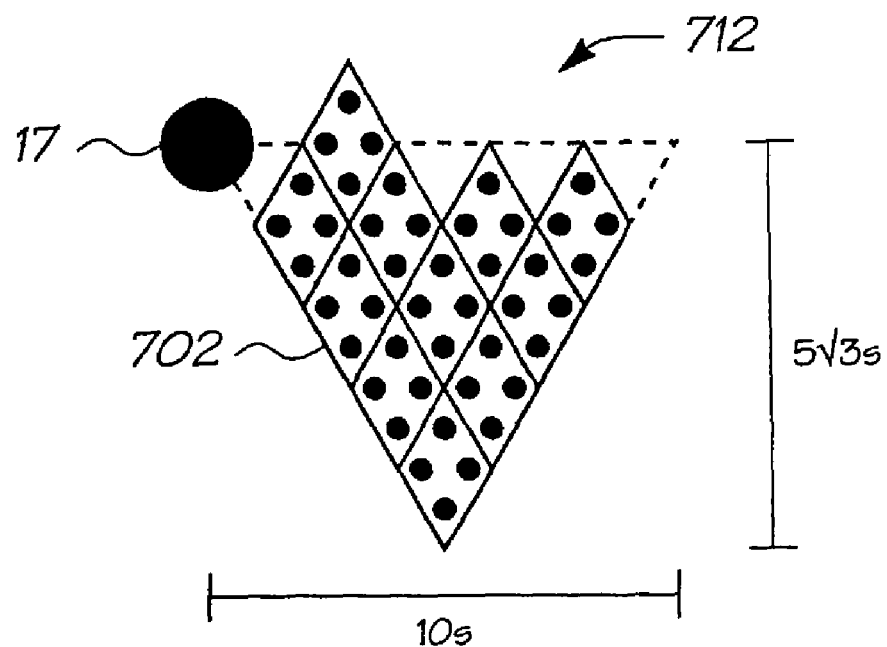
FIG. 4 shows a one-sixth segment of an hexagonal tag, with the segment containing a maximum of 11 four-bit symbols with the triangular macrodot packing shown in FIG. 1.

FIG. 4 shows a one-sixth segment 712 of a hexagonal tag, with the segment containing a maximum of 11 four-bit symbols with the triangular macrodot packing shown in FIG. 1. The target 17 is shared with adjacent segments. Each tag segment can, by way of example, support a codeword of an (11, k) Reed-Solomon code, i.e. a punctured (15, k) code, with the ability to detect u=11−k symbol errors, or correct t=⌊(11−k)/2⌋ symbol errors. For example, if k=7 then u=4 and t=2.

(EQ 1) gives the area of the corresponding hexagonal tag. (EQ 2) gives the radius of the required field of view. (EQ 3) gives the area of the required field of view. (EQ 4) gives the recovered bit data density for the field of view.

$$A_{TAG}=(10s)\times(5\sqrt{3}s)\times6=300\sqrt{3}s^2\cong520s^2 \quad (EQ\ 1)$$

$$R_{FOV}=(10s\times2)+2s=22s \quad (EQ\ 2)$$

$$A_{FOV}=\pi R^2_{FOV}\cong1521s^2 \quad (EQ\ 3)$$

$$D_{FOV}=(6\times11\times4)/A_{FOV}\cong0.17/s^2 \quad (EQ\ 4)$$

Figure 5:
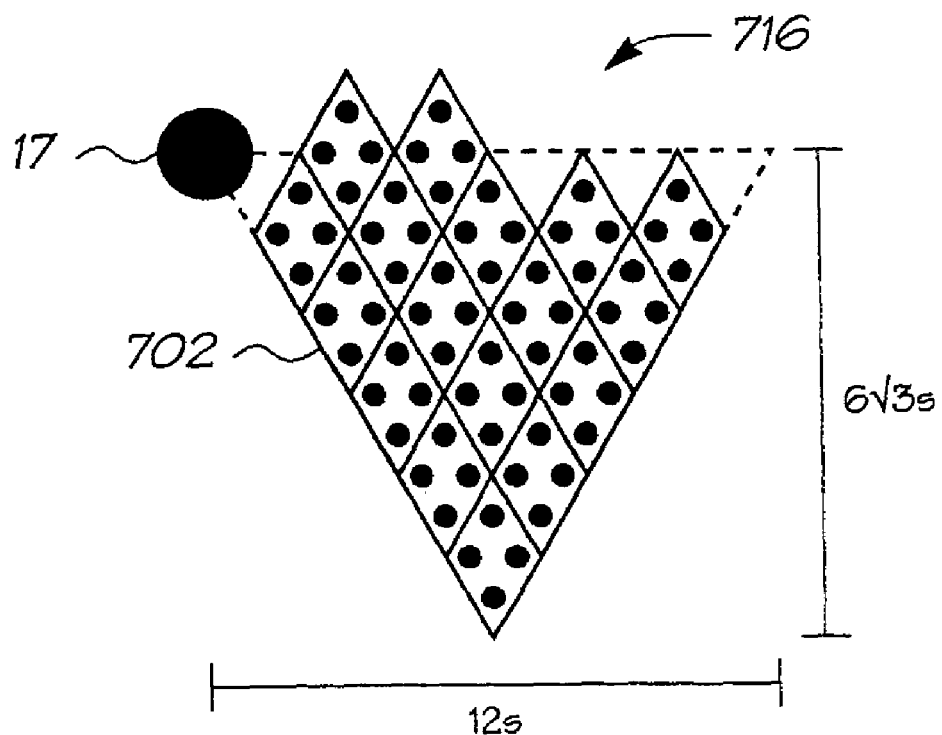
FIG. 5 shows a one-sixth segment of another hexagonal tag, with the segment containing a maximum of 17 four-bit symbols with the triangular macrodot packing shown in FIG. 1.

FIG. 5 shows a one-sixth segment 716 of another hexagonal tag, with the segment containing a maximum of 17 four-bit symbols with the triangular macrodot packing shown in FIG. 1. Each tag segment can, by way of example, support a codeword of a (17, k) Reed-Solomon code, i.e. an augmented (15, k) code, with the ability to detect u=17−k symbol errors, or correct t=⌊(17−k)/2⌋ symbol errors. For example, if k=7 then u=10 and t=5.

(EQ 5) gives the area of the corresponding hexagonal tag. (EQ 6) gives the radius of the required field of view. (EQ 7) gives the area of the required field of view. (EQ 8) gives the recovered bit data density for the field of view.

$$A_{TAG}=(12s)\times(6\sqrt{3}s)\times6=432\sqrt{3}s^2\cong748s \quad (EQ\ 5)$$

$$R_{FOV}=(12s\times2)+2s=26s \quad (EQ\ 6)$$

$$\pi R^2_{FOV}\cong2124s^2 \quad (EQ\ 7)$$

$$D_{FOV}=(6\times17\times4)/A_{FOV}\cong0.19/s^2 \quad (EQ\ 8)$$

Figure 6:
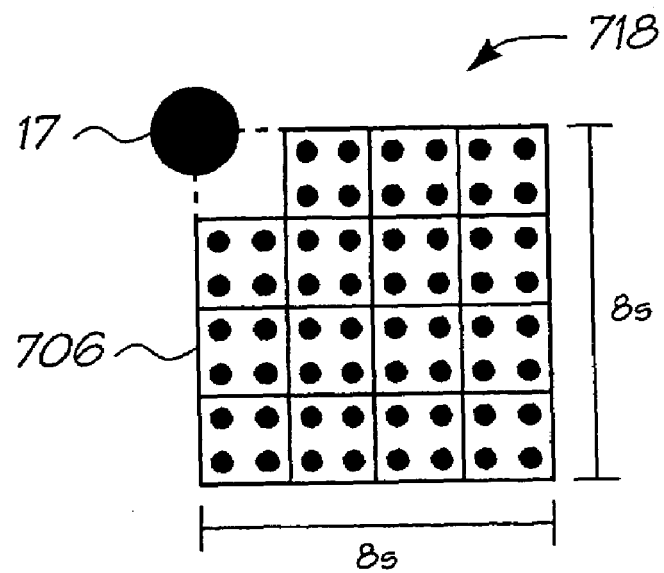
FIG. 6 shows a one-quarter segment of a square tag, with the segment containing a maximum of 15 four-bit symbols with the square macrodot packing shown in FIG. 2.

FIG. 6 shows a one-quarter segment 718 of a square tag, with the segment containing a maximum of 15 four-bit symbols with the square macrodot packing shown in FIG. 2. Each tag segment can, by way of example, support a codeword of a (15, k) Reed-Solomon code, with the ability to detect u=15−k symbol errors, or correct t=⌊(15−k)/2⌋ symbol errors. For example, if k=7 then u=8 and t=4.

(EQ 9) gives the area of the corresponding square tag. (EQ 10) gives the radius of the required field of view. (EQ 11) gives the area of the required field of view. (EQ 12) gives the recovered bit data density for the field of view.

$$A_{TAG}=(8s)\times(8s)\times4=256s^2 \quad (EQ\ 9)$$

$$R_{FOV}=((8s\times2)+2s)\times\sqrt{2}\cong25.5s \quad (EQ\ 10)$$

$$\pi R^2_{FOV}\cong2036s^2 \quad (EQ\ 11)$$

$$D_{FOV}=(4\times15\times4)/A_{FOV}\cong0.12/s^2 \quad (EQ\ 12)$$

Figure 7:
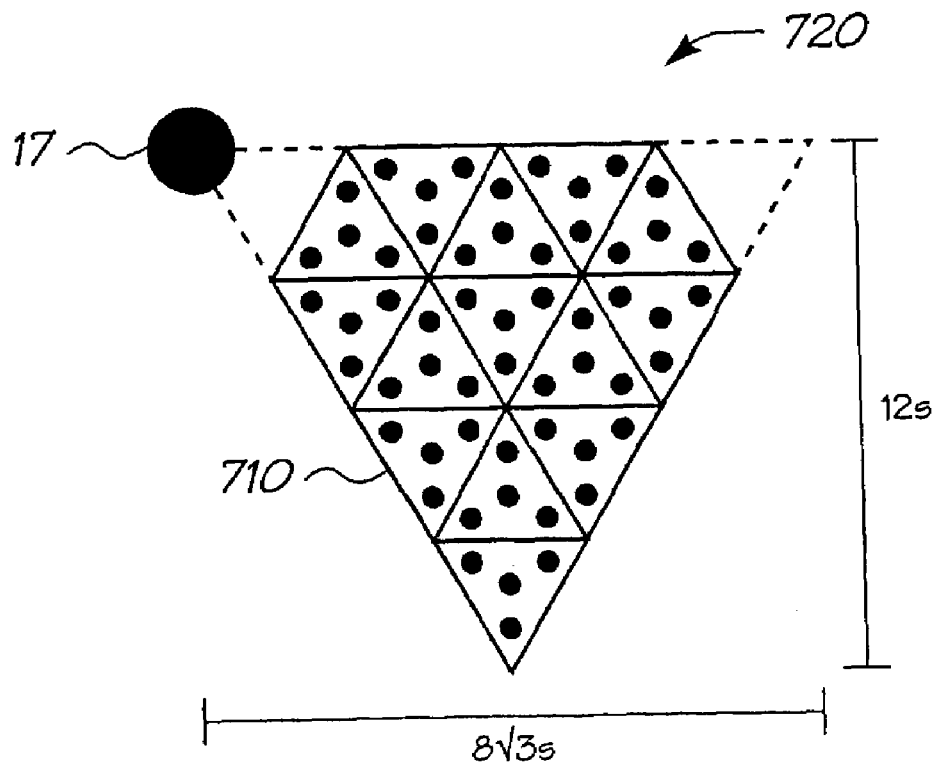
FIG. 7 shows a one-sixth segment of an hexagonal tag, with the segment containing a maximum of 14 four-bit symbols with the hexagonal macrodot packing shown in FIG. 3.

FIG. 7 shows a one-sixth segment 720 of an hexagonal tag, with the segment containing a maximum of 14 four-bit symbols with the hexagonal macrodot packing shown in FIG. 3. Each tag segment can, by way of example, support a codeword of a (14, k) Reed-Solomon code, i.e. a punctured (15, k) code, with the ability to detect u=14−k symbol errors, or correct t=⌊(14−k)/2⌋ symbol errors. For example, if k=6 then y=8 and t=4.

(EQ 13) gives the area of the hexagonal tag. (EQ 14) gives the radius of the required field of view. (EQ 15) gives the area of the required field of view. (EQ 16) gives the recovered bit data density for the field of view.

$$A_{TAG}=(8\sqrt{3}s)\times(12s)\times6=576\sqrt{3}s^2\cong998s^2 \quad (EQ\ 13)$$

$$R_{FOV}=(8\sqrt{3}s\times2)+2s\cong29.7s \quad (EQ\ 14)$$

$$\pi R^2_{FOV}\cong2774s^2 \quad (EQ\ 15)$$

$$D_{FOV}=(6\times14\times4)/A_{FOV}\cong0.12/s^2 \quad (EQ\ 16)$$

Of the tag designs considered, hexagonal tag designs using the tag segments shown in FIG. 4 and FIG. 5 yield fields of view with the highest recovered bit data densities. Square and hexagonal tag designs using the tag segments shown respectively in FIG. 6 and FIG. 7 yield fields of view with lower recovered bit data densities.

Hexagonal Tag Design

Figure 8:
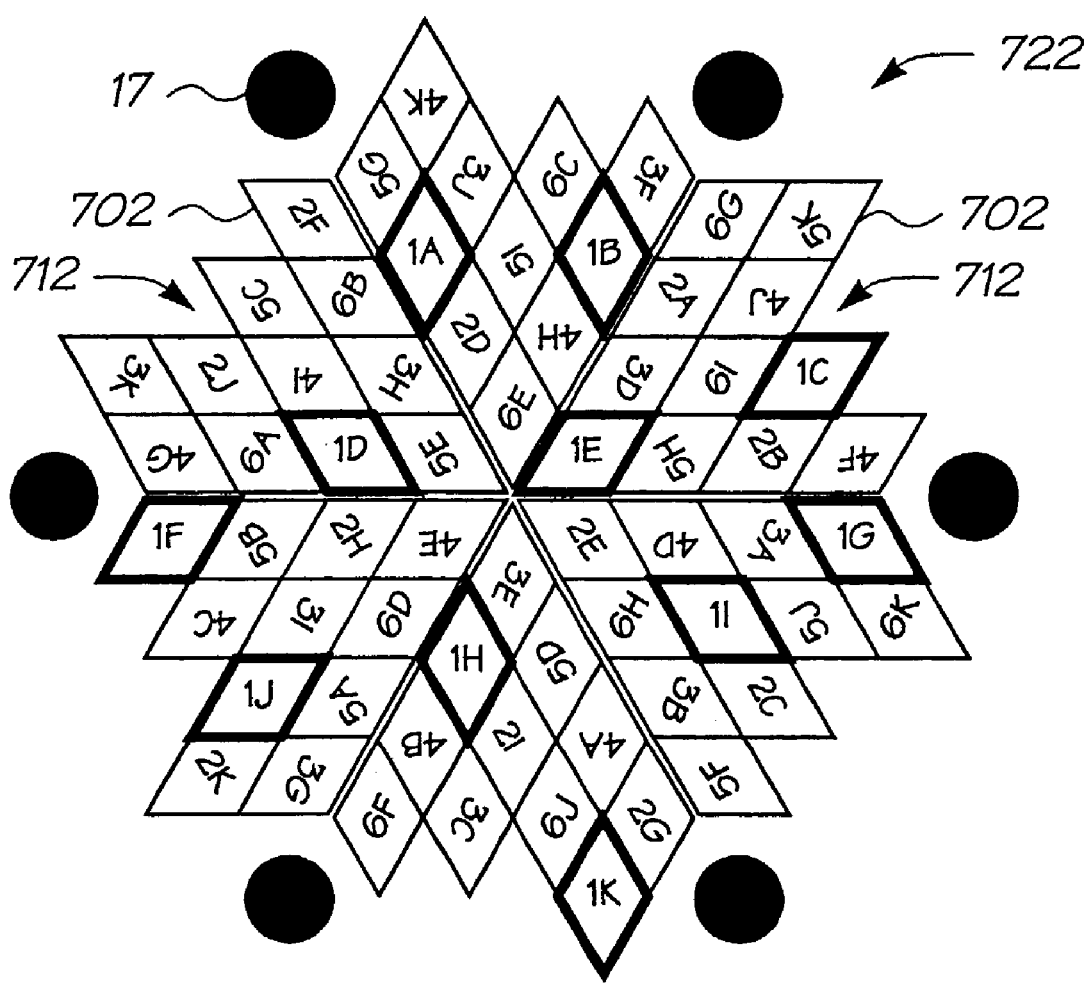
FIG. 8 shows a logical layout of a hexagonal tag using the tag segment of FIG. 4, with six interleaved $2^4$-ary $(11, k)$ codewords.
Figure 9:
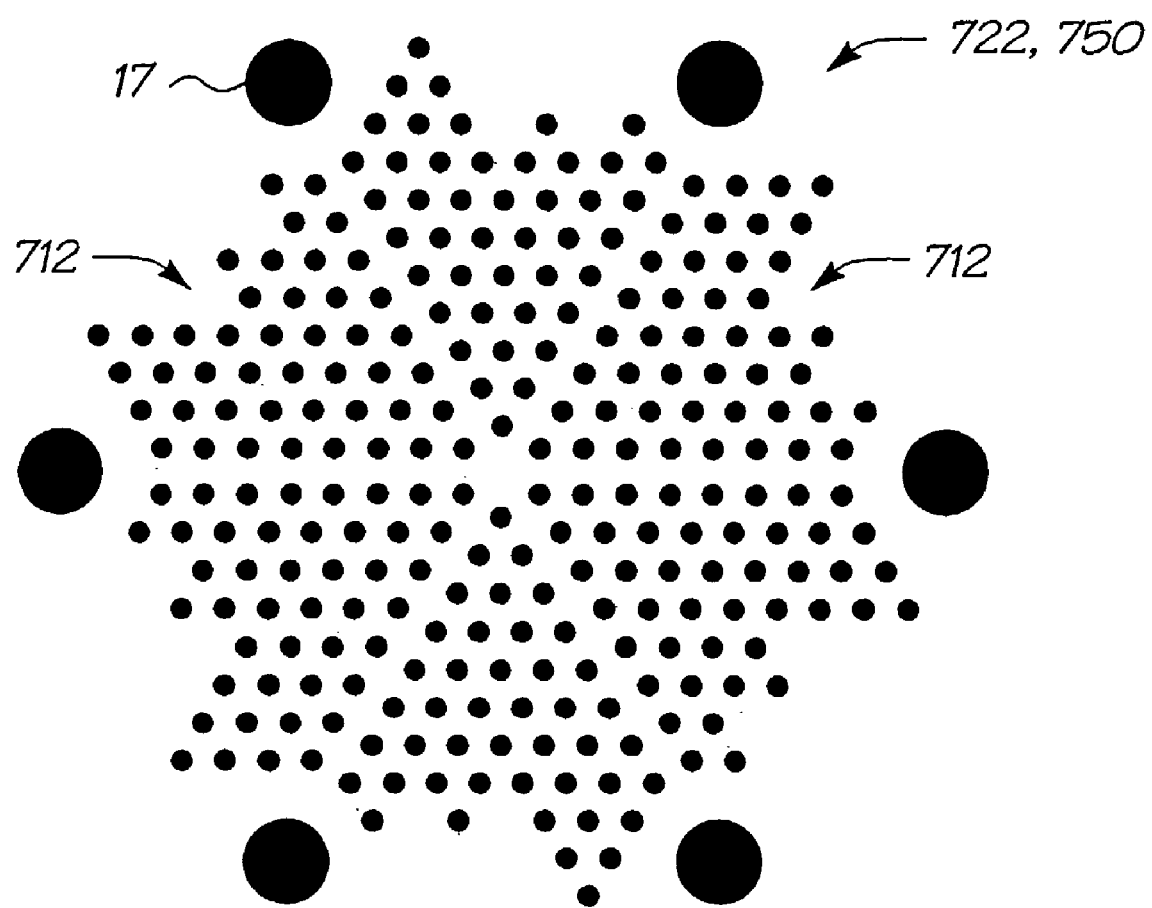
FIG. 9 shows the macrodot layout of the hexagonal tag of FIG. 8.
Figure 10:
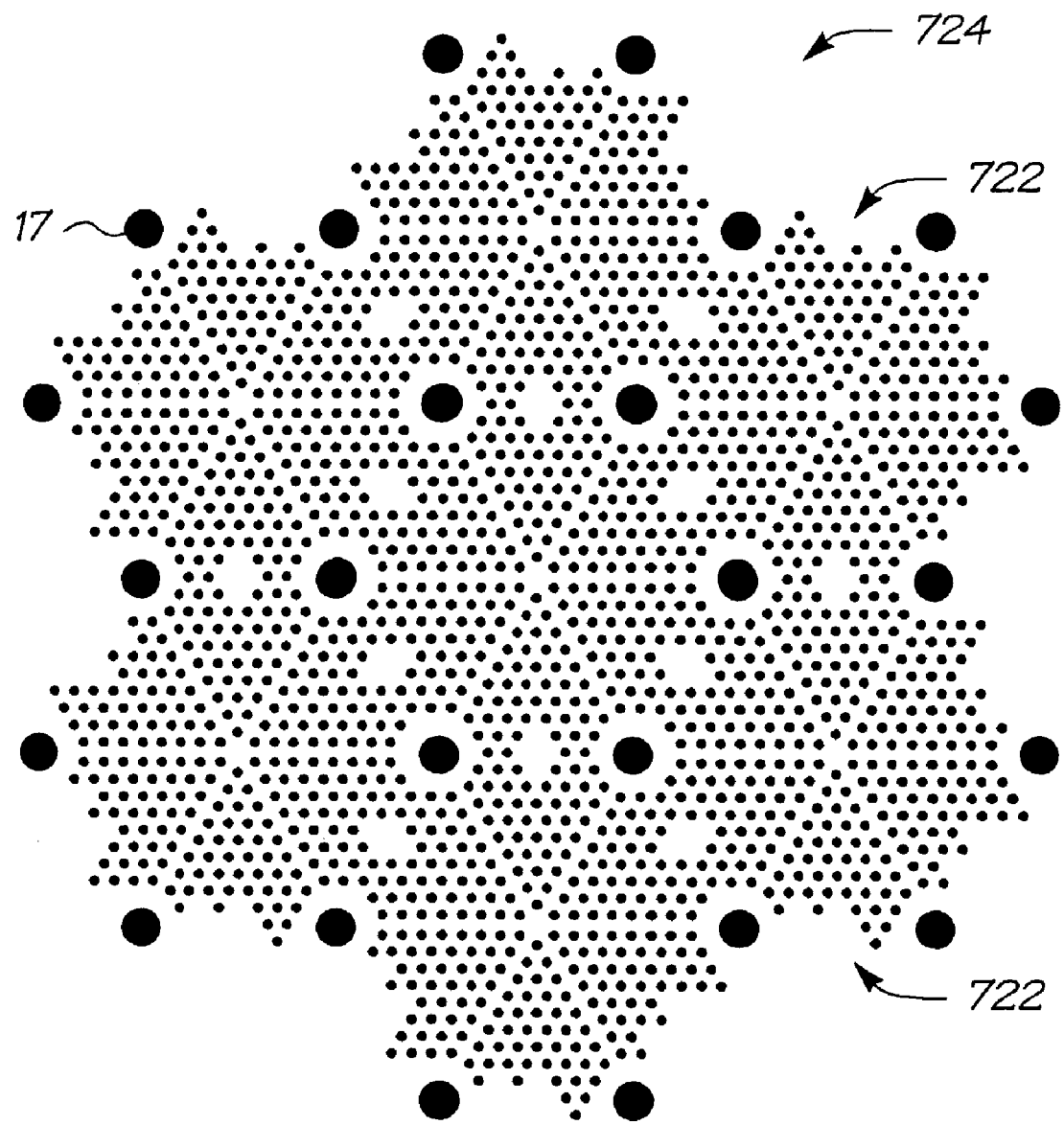
FIG. 10 shows an arrangement of seven abutting tags of the design of FIG. 8 and FIG. 9, with shared targets.

FIG. 8 shows a logical layout of a hexagonal tag 722 using the tag segment 712 of FIG. 4, with six interleaved $2^4$-ary (11, k) codewords. FIG. 9 shows the macrodot layout of the hexagonal tag 722 of FIG. 8. FIG. 10 shows an arrangement 724 of seven abutting tags 722 of the design of FIG. 9, with shared targets 17. The arrangement 724 shows that the hexagonal tag 722 can be used to tesselate a plane of arbitrary size.

Alternative Square Tag Design

Figure 12:
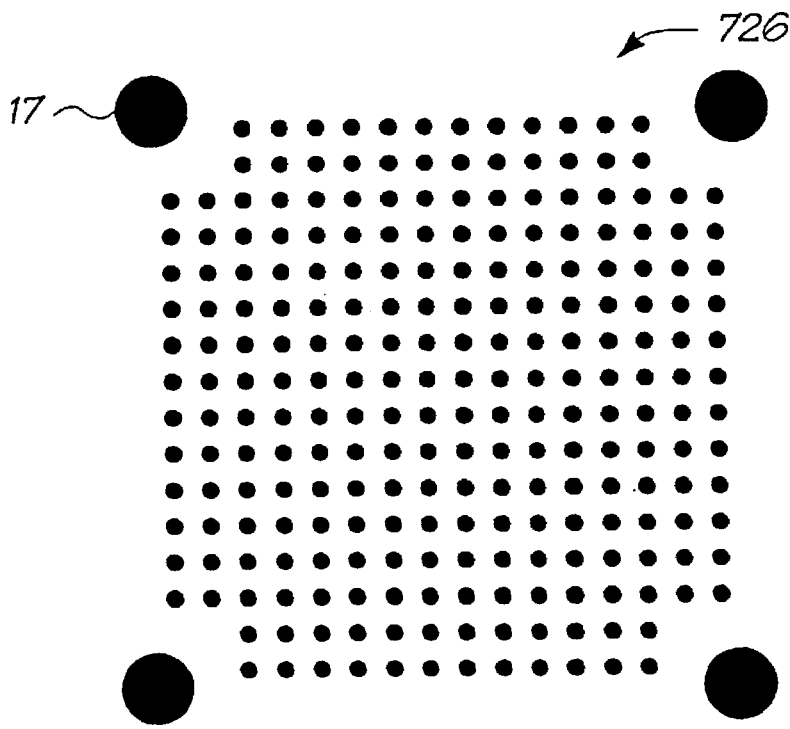
FIG. 12 shows the macrodot layout of the square tag of FIG. 11.

FIG. 11 shows a logical layout of another square tag 730, with four interleaved $2^3$-ary (7, k) codewords. Each 3-bit symbol 732 is represented by an L-shaped arrangement of three macrodots. FIG. 12 shows the macrodot layout of the square tag 730 of FIG. 11.

Triangular Tag Design

Figure 16:
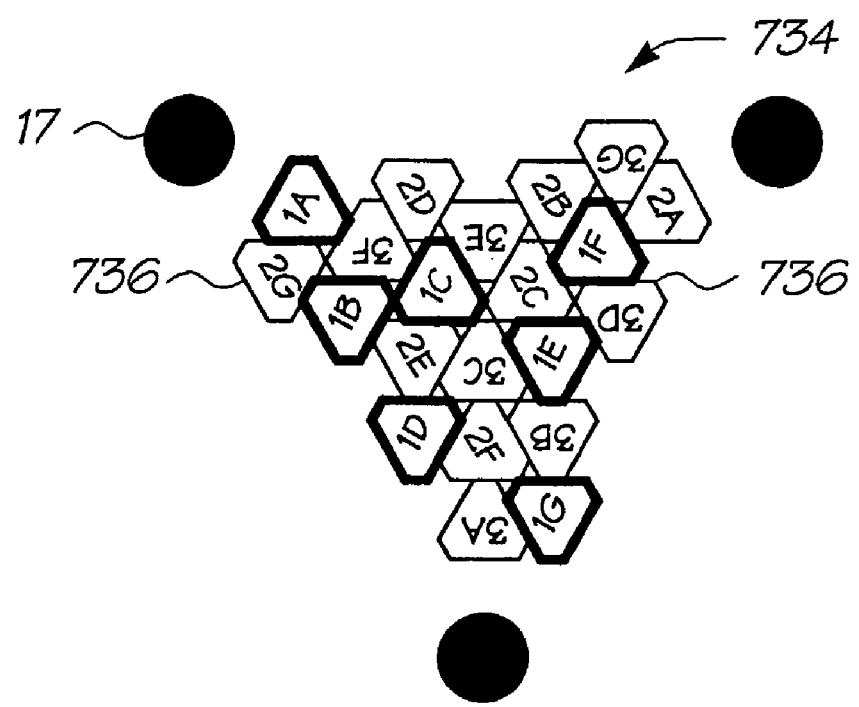
FIG. 16 shows a logical layout of a triangular tag, with three interleaved $2^3$-ary $(7, k)$ codewords.
Figure 17:
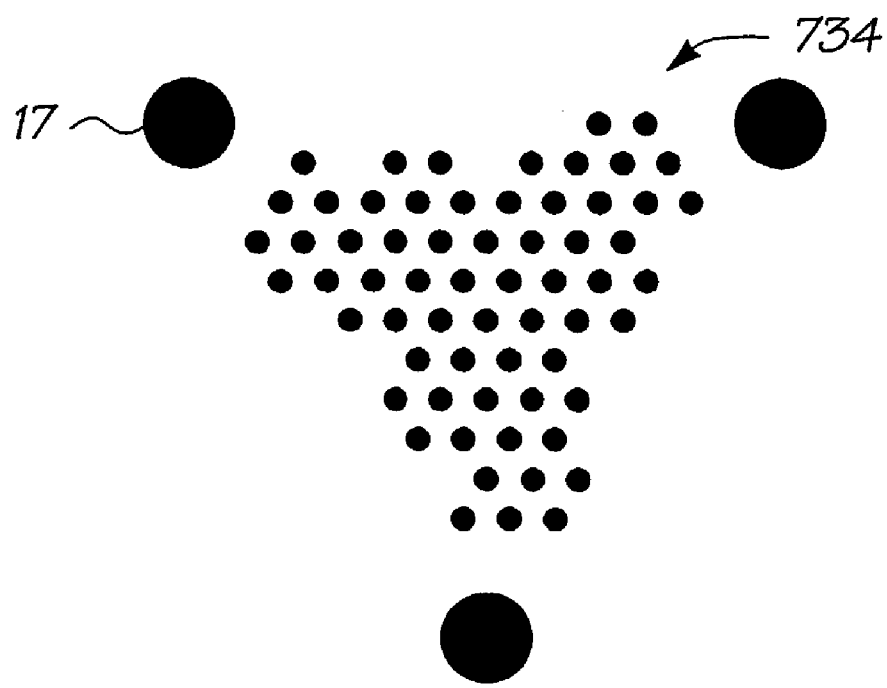
FIG. 17 shows the macrodot layout of the triangular tag of FIG. 16.

FIG. 16 shows a logical layout of a triangular tag 734, with three interleaved $2^3$-ary (7, k) codewords. Each 3-bit symbol 736 is represented by a triangular arrangement of three macrodots. FIG. 17 shows the macrodot layout of the triangular tag 734 of FIG. 16. As with the square and hexagonal tags described above, the triangular tag 734 can be used to tesselate a plane of arbitrary size.

Linear Tag Design

Figure 18:
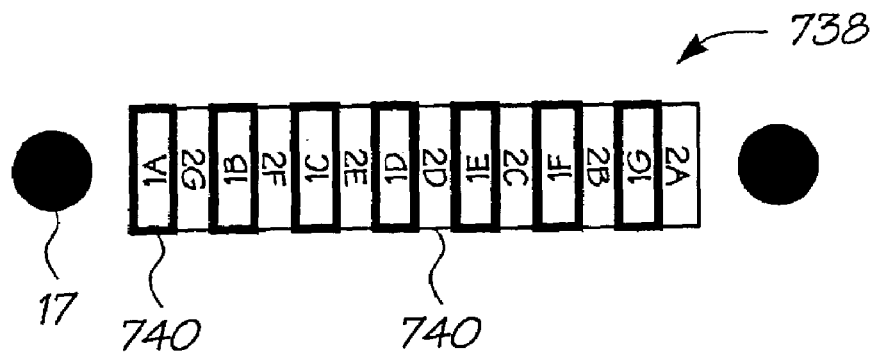
FIG. 18 shows a logical layout of a two-fold rotationally symmetric linear tag, with two interleaved $2^3$-ary $(7, k)$ codewords.
Figure 19:
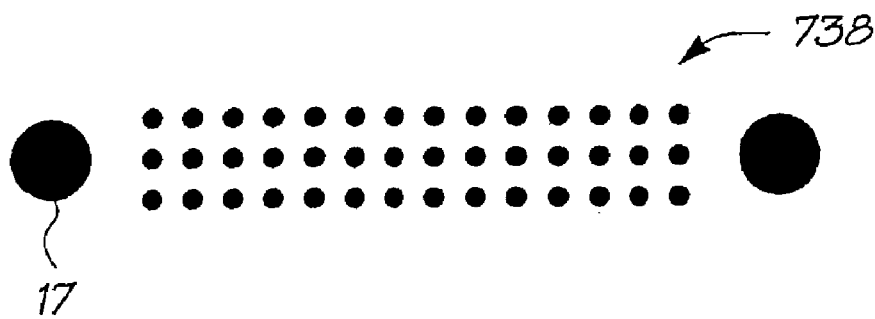
FIG. 19 shows the macrodot layout of the linear tag of FIG. 18.

FIG. 18 shows a logical layout of a two-fold rotationally symmetric linear tag 738, with two interleaved $2^3$-ary (7, k) codewords. Each 3-bit symbol 740 is represented by a linear arrangement of three macrodots. FIG. 19 shows the macrodot layout of the linear tag 738 of FIG. 18.

Figure 20:
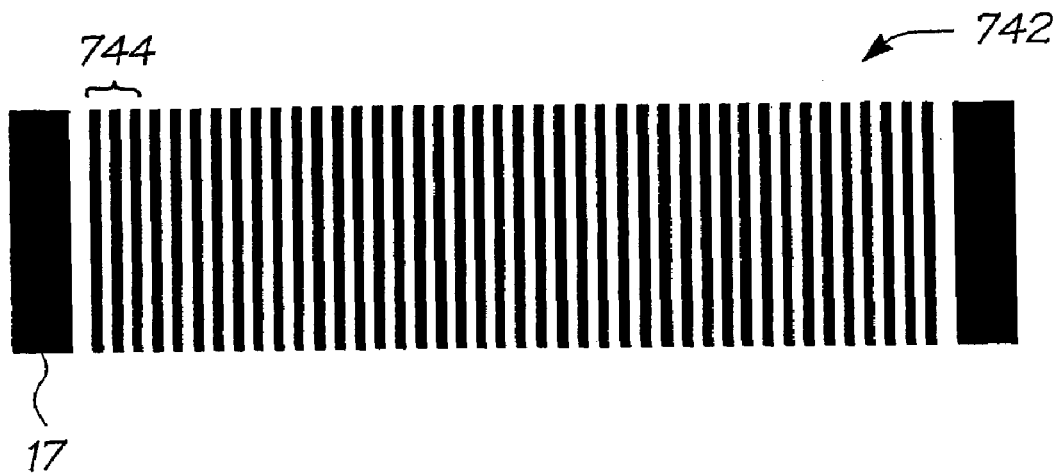
FIG. 20 shows an alternative macrodot layout based on the layout of the linear tag of FIG. 18, with a purely one-dimensional structure analogous to the structure of a conventional barcode.

FIG. 20 shows an alternative macrodot layout based on the layout of the linear tag of FIG. 18, with a purely one-dimensional structure analogous to the structure of a conventional barcode. Although the layout is based on that of the linear tag of FIG. 18, the target structures 17 are linear rather than circular. This embodiment is particularly suitable for use with prior art barcode scanners (with suitable software changes) adapted for linear scanning rather than area scanning.

Distributed Hexagonal Tag Design

Figure 21:
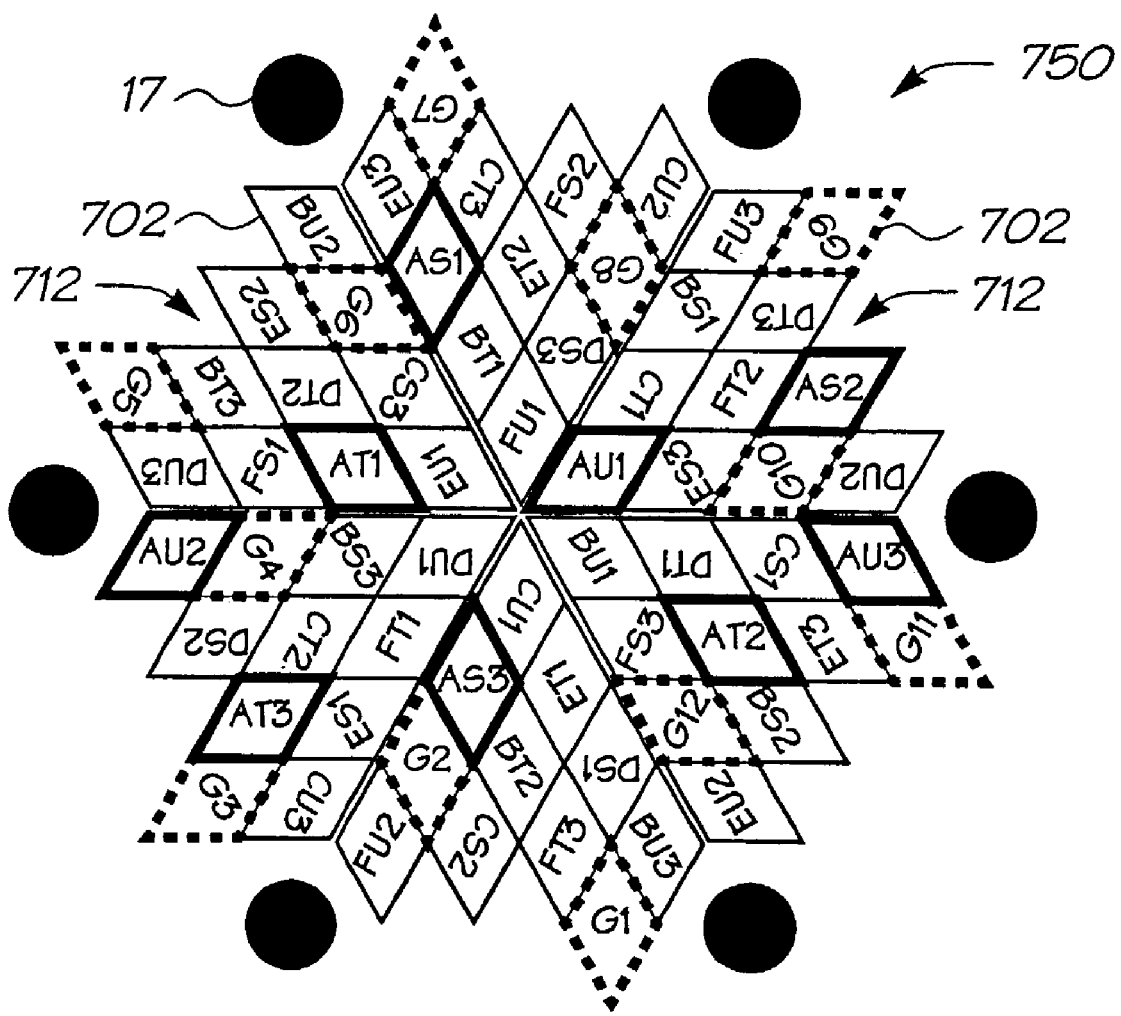
FIG. 21 shows a logical layout of an alternative hexagonal tag, with one local $2^4$-ary $(12, k)$ codeword, interleaved with eighteen 3-symbol fragments of eighteen distributed $2^4$-ary $(9, k)$ codewords.

FIG. 21 shows a logical layout of a hexagonal tag 750 using the tag segment of FIG. 4, with one local $2^4$ ary (12, k) codeword interleaved with eighteen 3-symbol fragments of eighteen distributed $2^4$-ary (9, k) codewords. FIG. 9 shows, as before, the macrodot layout of the hexagonal tag 750 of FIG. 21, and FIG. 10 shows an arrangement of seven abutting tags of the design of FIG. 9, with shared targets.

In the layout of FIG. 21, the twelve 4-bit symbols of the local codeword are labelled G1 through G12, and are shown with a dashed outline. Each symbol of the eighteen fragments of the eighteen distributed codewords is labelled with an initial prefix of A through F, indicating which of six nominal codewords the symbol belongs to, a subsequent prefix of S through U, indicating which 3-symbol part of the codeword the symbol belongs to, and a suffix of 1 through 3, indicating which of the three possible symbols the symbol is.

Figure 23:
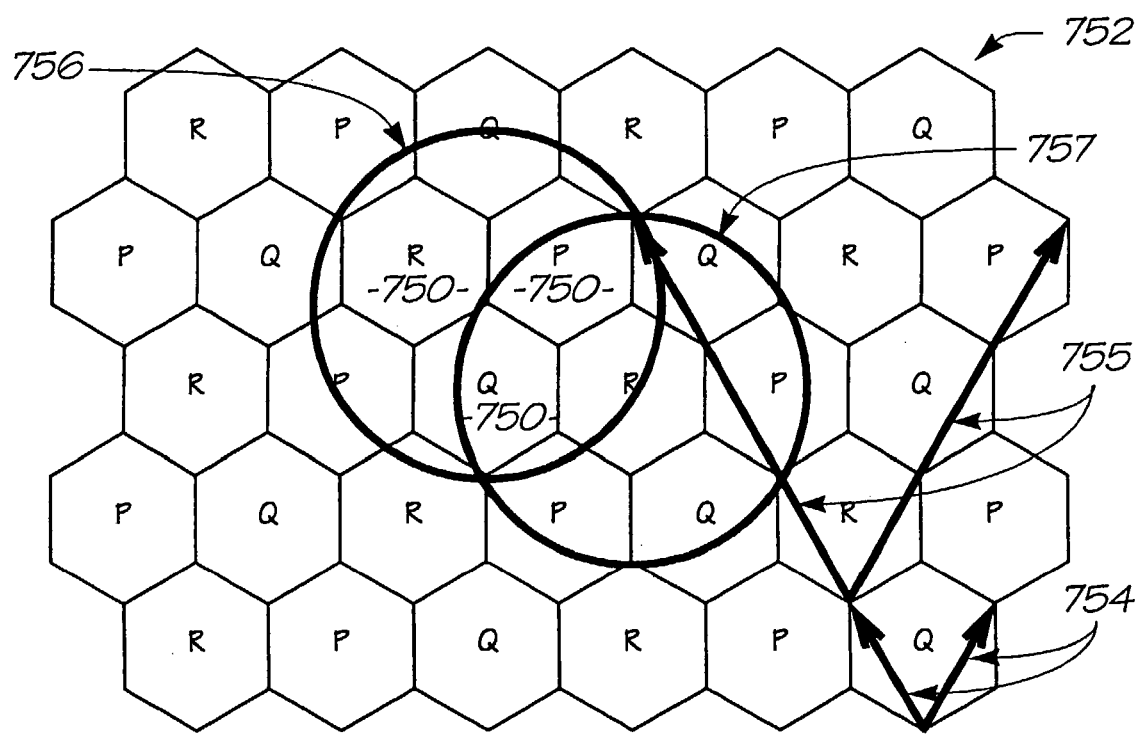
FIG. 23 shows a continuous tiling of three hexagonal tag types each with the structure of the tag of FIG. 21.

FIG. 23 shows a continuous tiling 752 of three hexagonal tag types labelled P, Q and R, each with the structure of tag 750. There are six distributed codewords (A through F) associated with each tag type (P, Q and R). The distributed tagging scheme is predicated on the data content of each respective distributed codeword AP, AQ, AR, etc. through FP, FQ and FR being constant throughout the tiling. Only the G codewords can contain unique data.

FIG. 23 shows lattice vectors 754 associated with the physical tag layout, and corresponding (i.e. iso-directional rather than minimal) lattice vectors 755 associated with the PQR tag layout. The ratio of the length of the PQR lattice vectors 755 to the length of the corresponding physical lattice vectors 754 is three, consistent with there being three distinct tag types P, Q and R in the PQR tag layout.

FIG. 23 also shows the coverage 756 and 757 of a minimal imaging field of view in two arbitrary positions with respect to the tiling. The field of view is minimal with respect to the tiling in the sense that it the smallest field of view which is guaranteed to include at least one complete tag. Tag 750 is structured so that the minimal field of view allows the recovery of the local codeword G of at least one tag, and the entire set of distributed codewords AP through FR via fragments of tags of type P, Q and R included in the field of view. Furthermore, the continuous tiling of tag 750 ensures that there is a codeword available with a known layout for each possible rotational and translational combination (of which there are eighteen). Each distributed codeword includes data which identifies the rotation of the codeword in relation to the tiling, thus allowing the rotation of the tiling with respect to the field of view to be determined from decoded data rather than from other structures, and the local codeword to be decoded at the correct orientation.

Once the field of view is imaged, decoding proceeds as follows. A codeword is sampled at an arbitrary rotation (of the possible six rotations with respect to the six targets). This consists of sampling three S symbols from the current tag, and sampling, at the same rotation, T and U symbols from adjacent tags, modulo the size and alignment of the field of view with respect to the tiling. The result is a single distributed $2^4$-ary (9, k) codeword. Decoding the codeword yields, among other data, the codeword orientation. Once the orientation is known, the local G codeword can be sampled and decoded at the correct orientation. Decoding the G codeword yields, among other data, the type of the corresponding tag (i.e. P, Q or R). This in turn allows the data content of the various distributed codewords to be correctly interpreted, once they are sampled and decoded. It also allows the distributed codewords to be selectively sampled and decoded. For example, codewords known to contain data which is assumed not to change during a stroke, such as the region ID, may be ignored.

Figure 22:
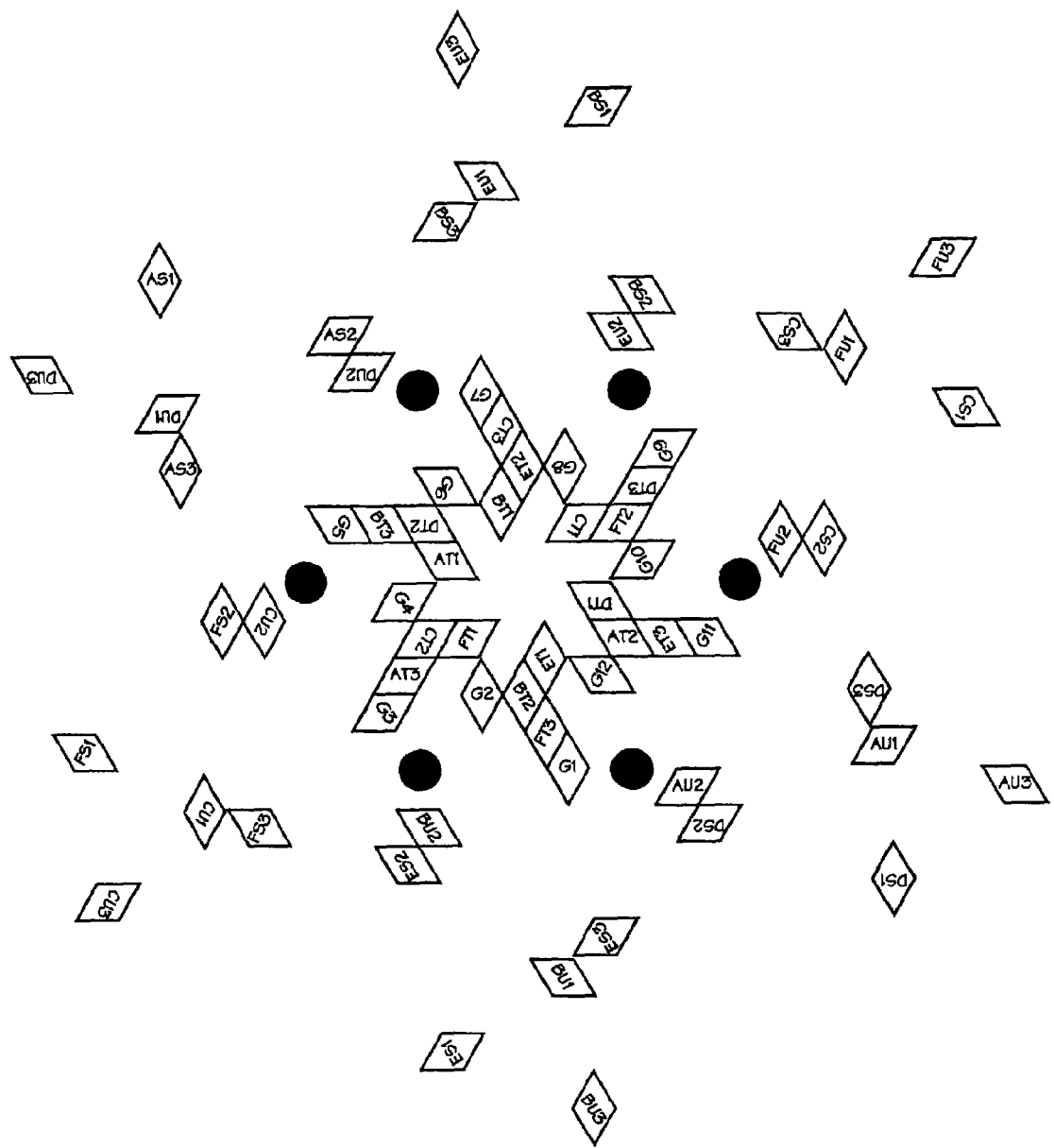
FIG. 22 shows the logical layout of the hexagonal tag of FIG. 21, re-arranged to show the distributed 3-symbol fragments which contribute to the same codewords.

FIG. 22 shows the logical layout of the hexagonal tag 750 of FIG. 21, re-arranged to show the distributed 3-symbol fragments which contribute to the same codewords. For example, if the central tag shown in FIG. 22 were a P-type tag, then the six distributed codewords shown in the figure would be the AP, BP, CP, DP, EP and FP codewords. FIG. 22 also shows the local G codeword of the tag. Clearly, given the distributed and repeating nature of the distributed codewords, different fragments from the ones shown in the figure can be used to build the corresponding codewords.

Although it is more space-efficient to record the tag type (P, Q or R) in the G codeword, the tag type corresponding to each (or to selected) distributed codewords can also be recorded in the distributed codewords themselves. In this case there is a fixed relationship between a codeword's alignment and the tag to which its tag type refers. For example, a codeword's tag type may always refer to the tag containing the S fragment of the codeword.

Note that with a larger field of view, a particular codeword need not be constant throughout the tiling, but may instead be allowed to be constant only in a certain direction. For example, a codeword used to encode a coordinate can be constant in the direction where the coordinate is constant, but can vary in (semi-)orthogonal directions (with respect to the rotational symmetry of the tiling). This has the advantage that semi-variable information can be encoded in distributed codewords rather than being restricted to local codewords.

Mirror-Symmetric Tag Designs

Figure 24:
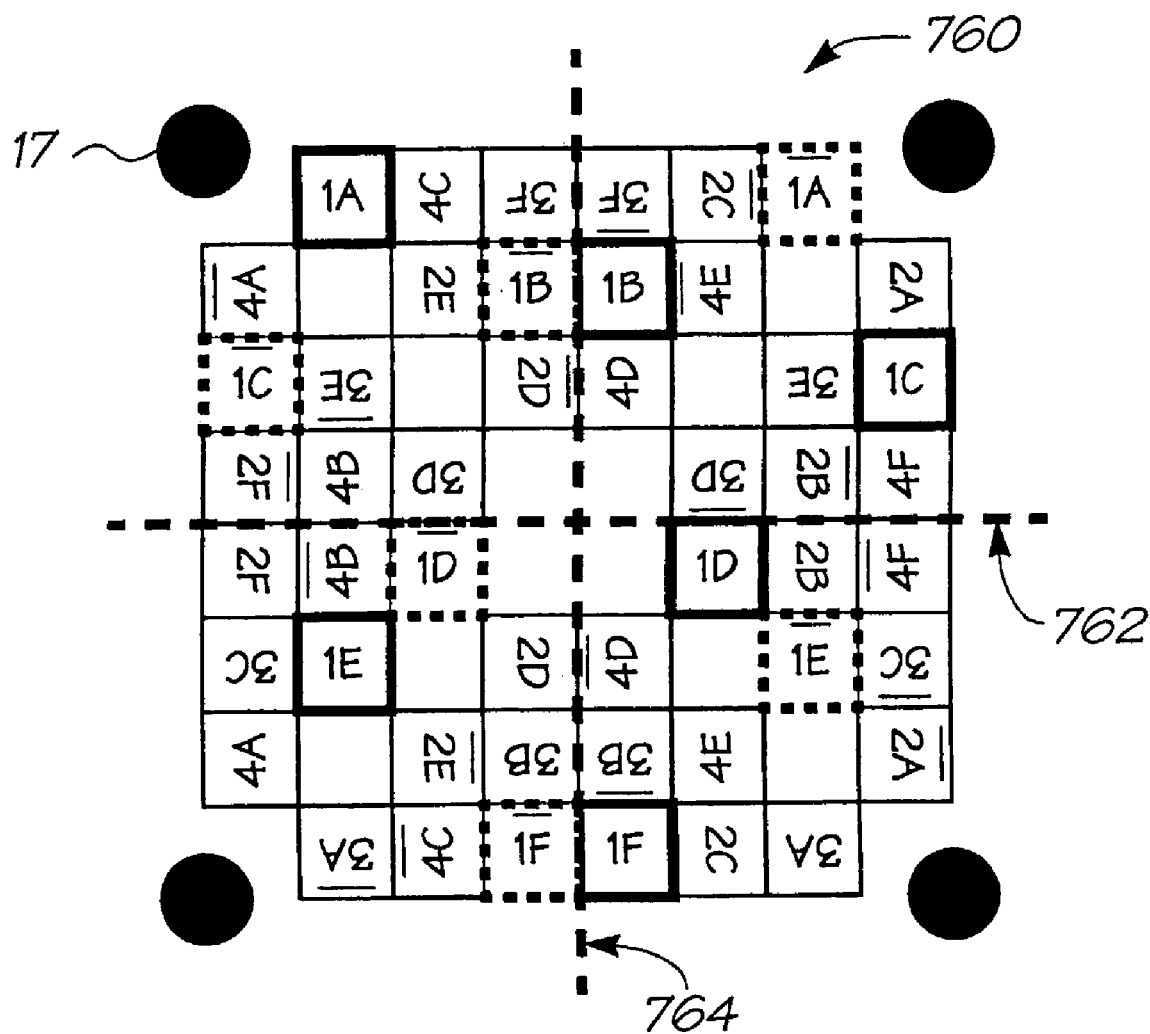
FIG. 24 shows a layout of an alternative square tag using the symbol of FIG. 2, with eight interleaved $2^4$-ary (6, k) codewords.

FIG. 24 shows a layout of a square tag 760 using the symbol of FIG. 2, with eight interleaved $2^4$-ary (6, k) codewords. Like the square tag of FIG. 11 discussed earlier, the tag of FIG. 24 contains four codewords, each arranged according to the same layout but each rotated according to a different one of the four possible rotations of the tag with respect to its own four-fold rotational symmetry. As discussed earlier, this allows a codeword to be sampled and decoded independently of the actual rotation of the tag, which allows the rotation of the tag to be encoded in the codeword(s).

The tag of FIG. 24 contains four additional codewords, laid out in the mirror image of the original four codewords with respect to the tag's two axes of reflection 762 and 764. This allows a codeword to be sampled and decoded independently of the actual rotation and reflection of the tag, which allows the rotation and reflection of the tag to be encoded in the codeword(s). This is useful if the tag may be imaged in reflection, e.g. reflected in a mirror or through the back of a transparent substrate.

Each codeword may explicitly indicate its rotation and reflection via a three-bit value, or implicitly via a one-bit value indicating whether the codeword corresponds to a pre-determined rotation and reflection or not.

In FIG. 24, each original symbol has a prefix (1–4) indicating which codeword it belongs to, and a suffix (A–F) indicating its position in the codeword. Each reflected symbol is shown with a bar above its label, as well as with a dashed outline.

Figure 25:
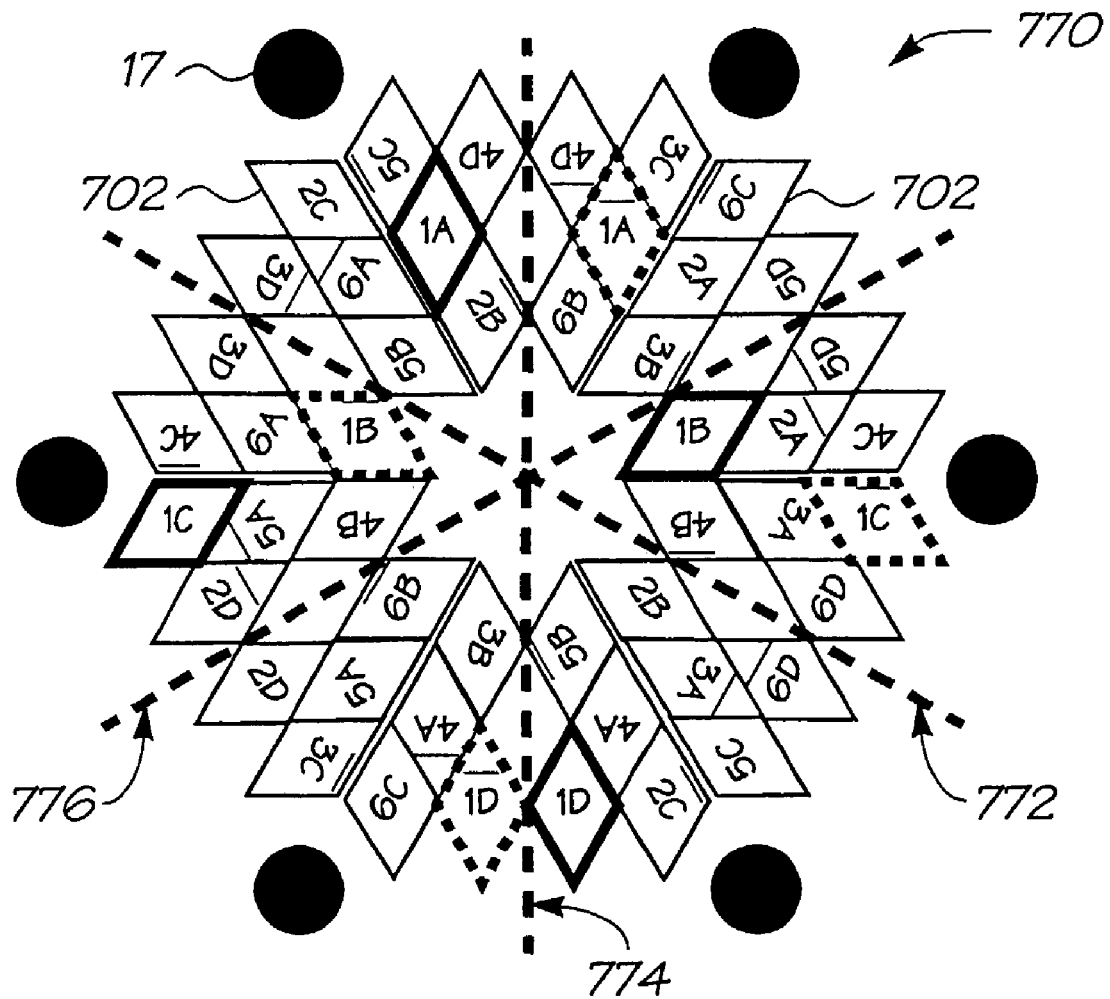
FIG. 25 shows a layout of an alternative hexagonal tag using the symbol of FIG. 1, with twelve interleaved $2^4$-ary (4, k) codewords.

FIG. 25 shows a layout of hexagonal tag 770 using the symbol of FIG. 1, with twelve interleaved $2^4$-ary (4, k) codewords. Like the hexagonal tag of FIG. 8 discussed earlier, the tag of FIG. 25 contains six codewords, each arranged according to the same layout but each rotated according to a different one of the six possible rotations of the tag with respect to its own six-fold rotational symmetry.

The tag of FIG. 25 contains six additional codewords, laid out in the mirror image of the original six codewords with respect to the tag's three axes of reflection 772, 774 and 776. As discussed above, this allows a codeword to be sampled and decoded independently of the actual rotation and reflection of the tag, which allows the rotation and reflection of the tag to be encoded in the codeword(s).

Each codeword may explicitly indicate its rotation and reflection via a four-bit value, or implicitly via a one-bit value indicating whether the codeword corresponds to a pre-determined rotation and reflection or not.

In FIG. 25, each original symbol has a prefix (1–6) indicating which codeword it belongs to, and a suffix (A–D) indicating its position in the codeword. Each reflected symbol is shown with a bar above its label, as well as with a dashed outline.

Note that the tags of FIG. 24 and FIG. 25 are not ideally sized for the number of symbols each codeword contains, since the data content of each codeword is low once allowance is made for useful redundancy. However, both serve to illustrate interleaved rotation-symmetric and mirror-symmetric tag designs, and the design principles obviously extend to tags of larger size and/or to tags incorporating different error-detecting and error-correcting schemes.

1.2.3 Tag Image Processing and Decoding

Figure 26:
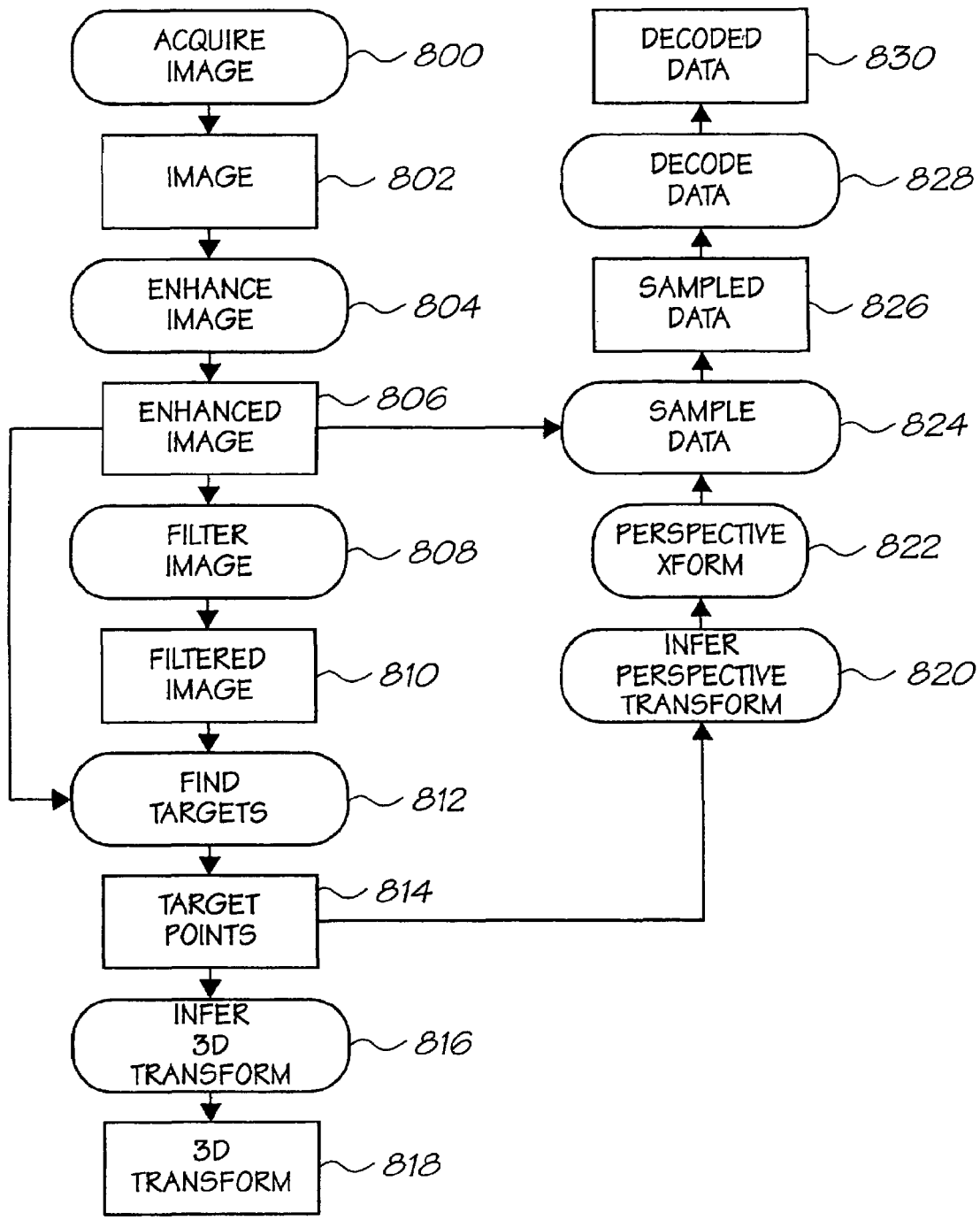
FIG. 26 shows a tag image processing and decoding process flow.

FIG. 26 shows a tag image processing and decoding process flow. A raw image 802 of the tag pattern is acquired (at 800), for example via an image sensor such as a CCD image sensor, CMOS image sensor, or a scanning laser and photodiode image sensor. The raw image is then typically enhanced (at 804) to produce an enhanced image 806 with improved contrast and more uniform pixel intensities. Image enhancement may include global or local range expansion, equalisation, and the like. The enhanced image 806 is then typically filtered (at 808) to produce a filtered image 810. Image filtering may consist of low-pass filtering, with the low-pass filter kernel size tuned to obscure macrodots but to preserve targets. The filtering step 808 may include additional filtering (such as edge detection) to enhance target features. The filtered image 810 is then processed to locate target features (at 812), yielding a set of target points. This may consist of a search for target features whose spatial inter-relationship is consistent with the known geometry of a tag. Candidate targets may be identified directly from maxima in the filtered image 810, or may the subject of further characterisation and matching, such as via their (binary or grayscale) shape moments (typically computed from pixels in the enhanced image 806 based on local maxima in the filtered image 810), as described in U.S. patent application Ser. No. 09/575,154. The search typically starts from the center of the field of view. The target points 814 found by the search step 812 indirectly identify the location of the tag in the three-dimensional space occupied by the image sensor and its associated optics. Since the target points 814 are derived from the (binary or grayscale) centroids of the targets, they are typically defined to sub-pixel precision.

It may be useful to determine the actual 3D transform of the tag (at 816), and, by extension, the 3D transform (or pose) 818 of the sensing device relative to the tag. This may be done analytically, as described in U.S. patent application Ser. No. 09/575,154, or using a maximum likelihood estimator (such as least squares adjustment) to fit parameter values to the 3D transform given the observed perspective-distorted target points (as described in P. R. Wolf and B. A. Dewitt, Elements of Photogrammetry with Applications in GIS, 3rd Edition, McGraw Hill, February 2000, the contents of which are herein incorporated by reference thereto). The 3D transform includes the 3D translation of the tag, the 3D orientation (rotation) of the tag, and the focal length and viewport scale of the sensing device, thus giving eight parameters to be fitted, or six parameters if the focal length and viewport scale are known (e.g. by design or from a calibration step). Each target point yields a pair of observation equations, relating an observed coordinate to a known coordinate. If eight parameters are being fitted, then five or more target points are needed to provide sufficient redundancy to allow maximum likelihood estimation. If six parameters are being fitted, then four or more target points are needed. If the tag design contains more targets than are minimally required to allow maximum likelihood estimation, then the tag can be recognised and decoded even if up to that many of its targets are damaged beyond recognition.

To allow macrodot values to be sampled accurately, the perspective transform of the tag must be inferred. Four of the target points are taken to be the perspective-distorted corners of a rectangle of known size in tag space, and the eight-degree-of-freedom perspective transform 822 is inferred (at 820), based on solving the well-understood equations relating the four tag-space and image-space point pairs (see Heckbert, P., Fundamentals of Texture Mapping and Image Warping, Masters Thesis, Dept. of EECS, U. of California at Berkeley, Technical Report No. UCB/CSD 89/516, June 1989, the contents of which are herein incorporated by reference thereto). The perspective transform may alternatively be derived from the 3D transform 818, if available.

The inferred tag-space to image-space perspective transform 822 is used to project (at 824) each known data bit position in tag space into image space where the real-valued position is used to bi-linearly (or higher-order) interpolate (at 824) the four (or more) relevant adjacent pixels in the enhanced input image 806. The resultant macrodot value is compared with a suitable threshold to determine whether it represents a zero bit or a one bit.

Once the bits of one or more complete codeword have been sampled, the codewords are decoded (at 828) to obtain the desired data 830 encoded in the tag. Redundancy in the codeword may be used to detect errors in the sampled data, or to correct errors in the sampled data.

As discussed in U.S. patent application Ser. No. 09/575, 154, the obtained tag data 830 may directly or indirectly identify the surface region containing the tag and the position of the tag within the region. An accurate position of the sensing device relative to the surface region can therefore be derived from the tag data 830 and the 3D transform 818 of the sensing device relative to the tag.

1.2.4 Tag Map

Decoding a tag results in a region ID, a tag ID, and a tag-relative pen transform. Before the tag ID and the tag-relative pen location can be translated into an absolute location within the tagged region, the location of the tag within the region must be known. This is given by a tag map, a function which maps each tag ID in a tagged region to a corresponding location.

A tag map reflects the scheme used to tile the surface region with tags, and this can vary according to surface type. When multiple tagged regions share the same tiling scheme and the same tag numbering scheme, they can also share the same tag map.

The tag map for a region must be retrievable via the region ID. Thus, given a region ID, a tag ID and a pen transform, the tag map can be retrieved, the tag ID can be translated into an absolute tag location within the region, and the tag-relative pen location can be added to the tag location to yield an absolute pen location within the region.

The tag ID may have a structure which assists translation through the tag map. It may, for example, encode Cartesian coordinates or polar coordinates, depending on the surface type on which it appears. The tag ID structure is dictated by and known to the tag map, and tag IDs associated with different tag maps may therefore have different structures. For example, the tag ID may simply encode a pair of x and y coordinates of the tag, in which case the tag map may simply consist of record of the coordinate precision. If the coordinate precision is fixed, then the tag map can be implicit.

1.2.5 Tagging Schemes

Two distinct surface coding schemes are of interest, both of which use the tag structure described earlier in this section. The preferred coding scheme uses "location-indicating" tags as already discussed. An alternative coding scheme uses object-indicating tags.

A location-indicating tag contains a tag ID which, when translated through the tag map associated with the tagged region, yields a unique tag location within the region. The tag-relative location of the pen is added to this tag location to yield the location of the pen within the region. This in turn is used to determine the location of the pen relative to a user interface element in the page description associated with the region. Not only is the user interface element itself identified, but a location relative to the user interface element is identified. Location-indicating tags therefore trivially support the capture of an absolute pen path in the zone of a particular user interface element.

An object-indicating tag contains a tag ID which directly identifies a user interface element in the page description associated with the region. All the tags in the zone of the user interface element identify the user interface element, making them all identical and therefore indistinguishable. Object-indicating tags do not, therefore, support the capture of an absolute pen path. They do, however, support the capture of a relative pen path. So long as the position sampling frequency exceeds twice the encountered tag frequency, the displacement from one sampled pen position to the next within a stroke can be unambiguously determined.

With either tagging scheme, the tags function in cooperation with associated visual elements on the netpage as user interactive elements in that a user can interact with the printed page using an appropriate sensing device in order for tag data to be read by the sensing device and for an appropriate response to be generated in the netpage system.

The invention claimed is:

1. Machine-readable coded data disposed on or in a substrate in accordance with a layout having mirror symmetry and n-fold rotational symmetry, where n is at least two, the layout including n identical first sub-layouts rotated 1/n revolutions apart about a center of rotational symmetry of the layout, the layout further including n identical second sub-layouts rotated 1/n revolutions apart about a center of rotational symmetry of the layout, each second sub-layout being a reflection of a corresponding one of the first sub-layouts, the coded data disposed in accordance with each sub-layout including rotation-indicating data that distinguishes the rotation of that sub-layout from the rotation of at least one other sub-layout within the layout, the coded data disposed in accordance with each sub-layout further including reflection-indicating data that distinguishes the reflection of that sub-layout from the reflection of its corresponding reflected sub-layout.

2. Machine-readable coded data according to claim 1 wherein the rotation-indicating data and the reflection-indicating data together distinguish the rotation and reflection of the sub-layout from the rotation and reflection of each of the other sub-layouts within the layout.

3. Machine-readable coded data according to claim 1 wherein the coded data is redundantly encoded and the coded data of each sub-layout includes at least one coded data codeword.

4. Machine-readable coded data according to claim 3 wherein the coded data is redundantly encoded using a Reed-Solomon encoding.

5. Machine-readable coded data according to claim 1 wherein each sub-layout defines a plurality of positions of data elements, the sub-layouts being interleaved with each other without any two data elements overlapping each other.

6. Machine-readable coded data according to claim 1 wherein the layout is repeated on the substrate to form a super-layout.

7. Machine-readable coded data according to claim 6 wherein the layouts are packed together on the substrate to form the super-layout.

8. Machine-readable coded data according to claim 1 wherein the layout takes the form of any of the following shapes:

linear;

square;

rectangular;

triangular; or hexagonal.

9. Machine-readable coded data according to claim 1 wherein the coded data includes one or more target features for enabling preliminary location and rotation of the layout to be determined by a machine used to read the coded data.

10. Machine-readable coded data according to claim 9 wherein the target features are configured to enable perspective correction of the coded data of the, or each, layout upon reading by the machine.

11. Machine-readable coded data according to claim 10 wherein the coded data include at least four of the target features, and that a plurality of the layouts share some of the same target features.

12. A surface bearing machine-readable coded data, the machine-readable coded data being arranged in accordance with a layout having mirror symmetry and n-fold rotational symmetry, where n is at least two, the layout including n identical first sub-layouts rotated 1/n revolutions apart about a center of rotational symmetry of the layout, the layout further including n identical second sub-layouts rotated 1/n revolutions apart about a center of rotational symmetry of the layout, each second sub-layout being a reflection of a corresponding one of the first sub-layouts, the coded data disposed in accordance with each sub-layout including rotation-indicating data that distinguishes the rotation of that sub-layout from the rotation of at least one other sub-layout within the layout, the coded data disposed in accordance with each sub-layout further including reflection-indicating data that distinguishes the reflection of that sub-layout from the reflection of its corresponding reflected sub-layout.

13. A surface according to claim 12 further including visible markings.

14. A surface according to claim 12 configured for use as an interface surface for enabling user interaction with a computer.

15. A method of generating an interface surface, including the steps of:

receiving, in a printer, user data;

generating machine-readable coded data incorporating the user data, the machine-readable coded data being arranged in accordance with a layout having mirror symmetry and n-fold rotational symmetry, where n is at least two, the layout including n identical first sub-layouts rotated 1/n revolutions apart about a center of rotational symmetry of the layout, the layout further including n identical second sub-layouts rotated 1/n revolutions apart about a center of rotational symmetry of the layout, each second sub-layout being a reflection of a corresponding one of the first sub-layouts, the coded data being arranged in accordance with each sub-layout including rotation-indicating data that distinguishes the rotation of that sub-layout from the rotation of at least one other sub-layout within the layout, the coded data being arranged in accordance with each sub-layout further including reflection-indicating data that distinguishes the reflection of that sub-layout from the reflection of its corresponding reflected sub-layout; and printing the coded data onto a substrate.

16. A method according to claim 15 wherein the method further includes the step of printing visible markings on the substrate, preferably simultaneously with the coded data.

17. A method of using a sensing device to read machine-readable coded data, the machine-readable coded data being disposed on or in a substrate in accordance with a layout having mirror symmetry and n-fold rotational symmetry, where n is at least two, the layout including n identical first sub-layouts rotated 1/n revolutions apart about a center of rotational symmetry of the layout, the layout further including n identical second sub-layouts rotated 1/n revolutions apart about a center of rotational symmetry of the layout, each second sub-layout being a reflection of a corresponding one of the first sub-layouts, the coded data disposed in accordance with each sub-layout including rotation-indicating data that distinguishes the rotation of that sub-layout from the rotation of at least one other sub-layout within the layout, the coded data disposed in accordance with each sub-layout further including reflection-indicating data that distinguishes the reflection of that sub-layout from the reflection of its corresponding reflected sub-layout, the method including the steps of:
  (a) reading, using the sensing device, the coded data of the layout;
  (b) decoding the coded data of at least one of the sub-layouts of the layout, thereby determining at least the rotation-indicating data and reflection-indicating data of that sub-layout; and
  (c) using the rotation-indicating data and reflection-indicating data to interpret the meaning of at least some of the coded data.

18. A method according to claim 17 wherein step (a) includes the substeps of:
  imaging the substrate to generate an image thereof;
  processing the image to locate one or more target features of the coded data; and
  on the basis of the located target features, determining a position of at least one of the sub-layouts.

* * * * *